(12) United States Patent
Abe et al.

(10) Patent No.: US 8,322,748 B2
(45) Date of Patent: Dec. 4, 2012

(54) AIRBAG, AIRBAG DEVICE AND AIRBAG EXHAUSTING METHOD

(75) Inventors: Kazuhiro Abe, Minato-ku (JP);
Yasuhito Miyata, Minato-ku (JP);
Masayoshi Kumagai, Minato-ku (JP)

(73) Assignee: Takata Corporation, Tokyo (JP)

( * ) Notice: Subject to any disclaimer, the term of this patent is extended or adjusted under 35 U.S.C. 154(b) by 177 days.

(21) Appl. No.: 12/452,144

(22) PCT Filed: May 9, 2008

(86) PCT No.: PCT/JP2008/058601
§ 371 (c)(1),
(2), (4) Date: Feb. 2, 2010

(87) PCT Pub. No.: WO2008/155955
PCT Pub. Date: Dec. 24, 2008

(65) Prior Publication Data
US 2010/0201107 A1    Aug. 12, 2010

(30) Foreign Application Priority Data

Jun. 18, 2007  (JP) ................................ 2007-160644

(51) Int. Cl.
*B60R 21/239* (2006.01)
(52) U.S. Cl. ..................... 280/739; 280/732; 280/730.2; 280/743.2
(58) Field of Classification Search .................. 280/739, 280/743.2, 732, 731, 730.2, 730.1, 728.1
See application file for complete search history.

(56) References Cited

U.S. PATENT DOCUMENTS

| 5,413,378 | A | 5/1995 | Steffens, Jr. et al. |
| 6,188,940 | B1 | 2/2001 | Blackburn et al. |
| 6,290,257 | B1 | 9/2001 | Bunce et al. |
| 6,616,184 | B2 * | 9/2003 | Fischer ..................... 280/743.2 |
| 6,648,371 | B2 | 11/2003 | Vendely et al. |
| 6,773,030 | B2 * | 8/2004 | Fischer ........................ 280/739 |
| 6,832,778 | B2 | 12/2004 | Pinsenschaum et al. |

(Continued)

FOREIGN PATENT DOCUMENTS

FR    2 757 465 A1    6/1998

(Continued)

*Primary Examiner* — Ruth Ilan
*Assistant Examiner* — Keith Frisby
(74) *Attorney, Agent, or Firm* — Foley & Lardner LLP

(57) ABSTRACT

[Object] To provide an airbag, an airbag apparatus, and an air-discharging method of the airbag which are able to reduce the pressure loss during inflation and deployment of the airbag, or is able to demonstrate the impact absorbing capability of the airbag apparatus efficiently depending on the physical structure of an occupant.
[Solving Means] The airbag apparatus of the present invention includes a gas generator 1 configured to generate gas under predetermined conditions, an airbag 2 connected to the gas generator 1 and configured to be inflated and deployed, and a retainer 3 configured to store the airbag 2, and the airbag 2 includes a protrusion 4 which forms a portion protruding outward partly on the airbag 2, a vent hole 5 formed on the protrusion 4, a strap 6 connected at one end to the protrusion 4 and at the other end to the interior of the airbag 2, and an insertion hole 7 configured to guide the other end of the strap 6 into the interior of the airbag 2, and the vent hole 5 is arranged in an area where the protrusion 4 and the airbag 2 are overlapped with each other when the protrusion 4 is pulled by the strap 6.

25 Claims, 20 Drawing Sheets

U.S. PATENT DOCUMENTS

| | | |
|---|---|---|
| 2003/0020266 A1 | 1/2003 | Vendely et al. |
| 2005/0248137 A1 | 11/2005 | Delventhal et al. |
| 2006/0151979 A1 | 7/2006 | DePottey et al. |
| 2006/0192370 A1* | 8/2006 | Abe et al. ............. 280/735 |
| 2006/0192371 A1* | 8/2006 | Abe ...................... 280/739 |
| 2007/0045997 A1* | 3/2007 | Abe et al. ............. 280/729 |
| 2007/0145729 A1* | 6/2007 | Ishiguro et al. ...... 280/739 |
| 2008/0042416 A1* | 2/2008 | Razazi et al. ........ 280/743.2 |

FOREIGN PATENT DOCUMENTS

| | | |
|---|---|---|
| JP | 6-127330 A | 5/1994 |
| JP | 7-277129 A | 10/1995 |
| JP | 2004-067074 A | 3/2004 |
| JP | 2004-161257 A | 6/2004 |
| JP | 2006-127330 A | 5/2006 |
| JP | 2006-142958 A | 6/2006 |
| JP | 2006-168566 A | 6/2006 |
| JP | 2007-145181 A | 6/2007 |
| JP | 2007-277129 A | 10/2007 |
| WO | WO 2004/009404 A2 | 1/2004 |
| WO | WO 2006/041547 A2 | 4/2006 |
| WO | WO 2006/041552 A2 | 4/2006 |

* cited by examiner

FIG. 2
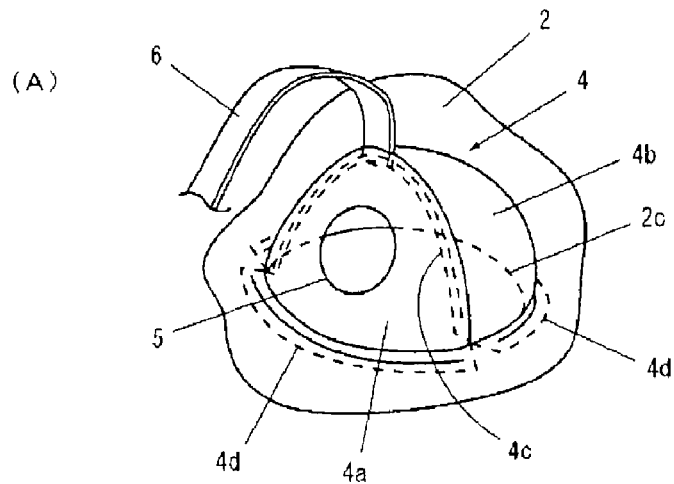
(A)
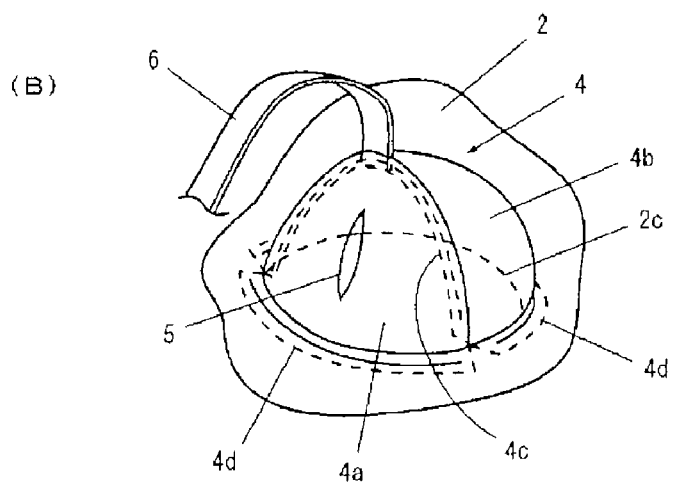
(B)
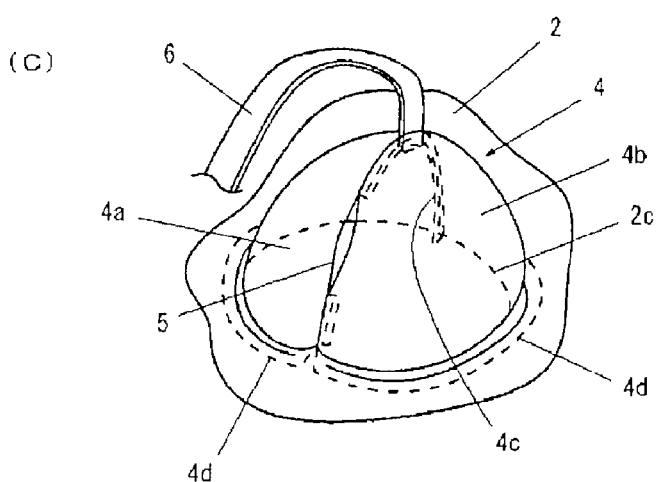
(C)

FIG. 3
(A)
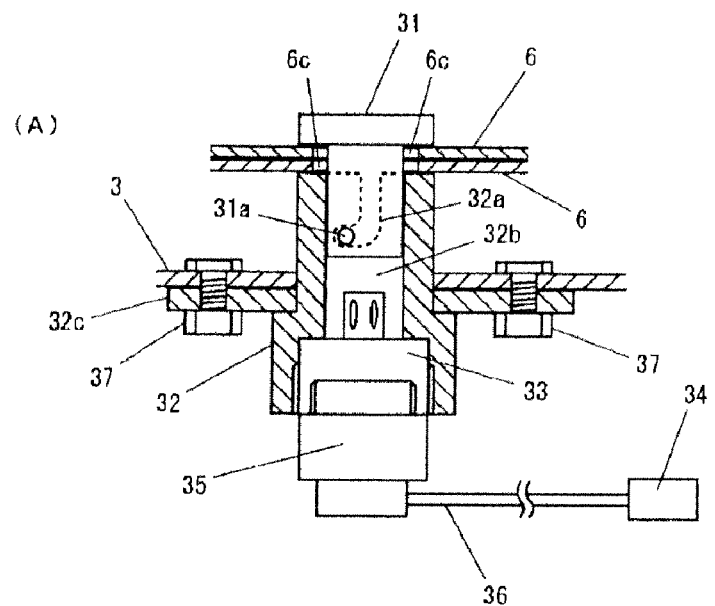
(B)
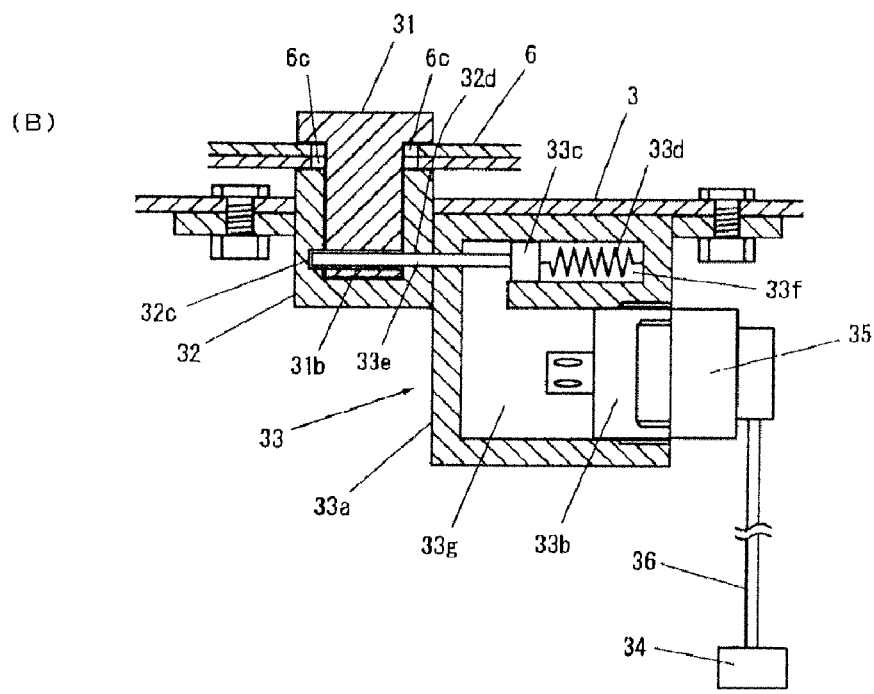

FIG. 4
(A)
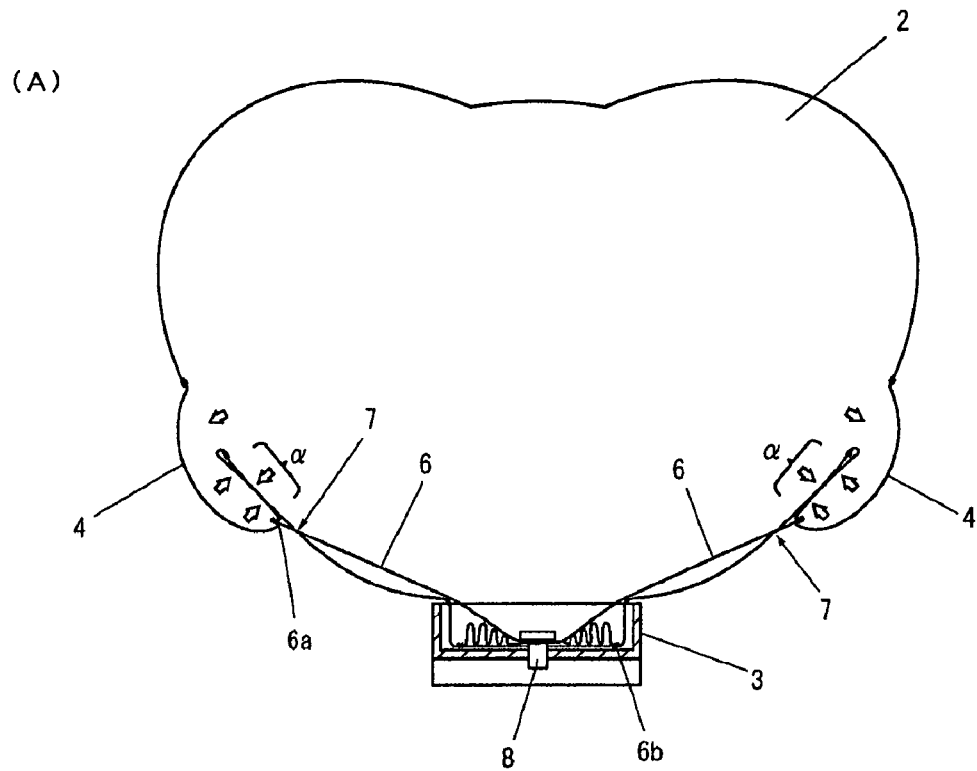
(B)
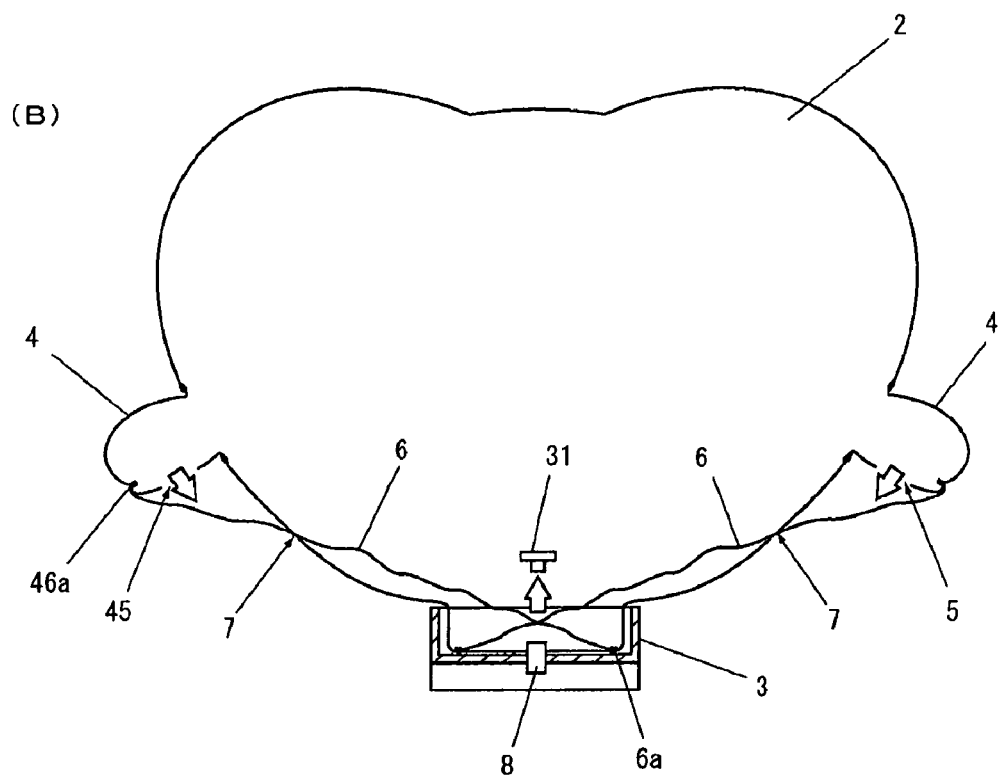

FIG. 5
(A)
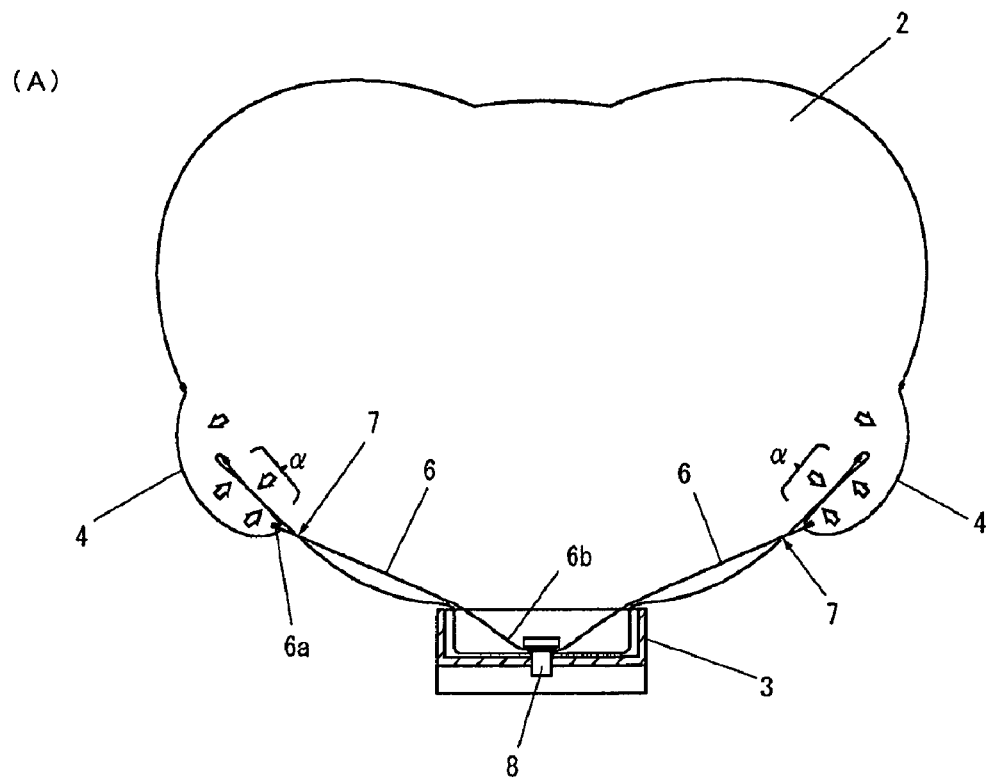
(B)
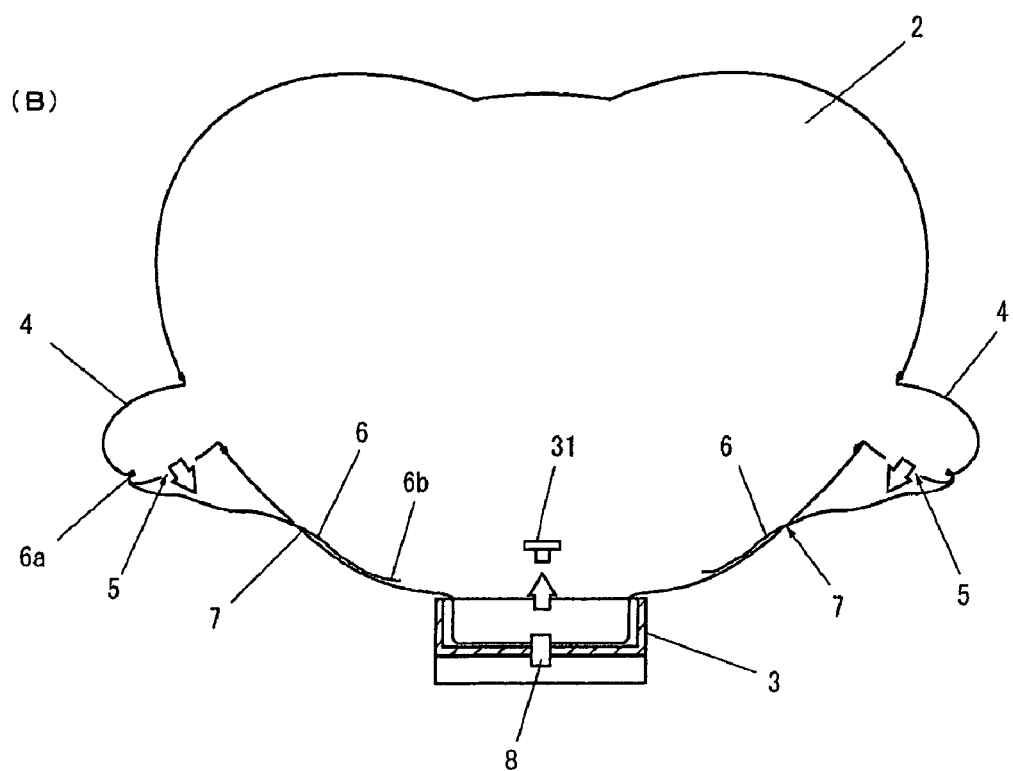

FIG. 11
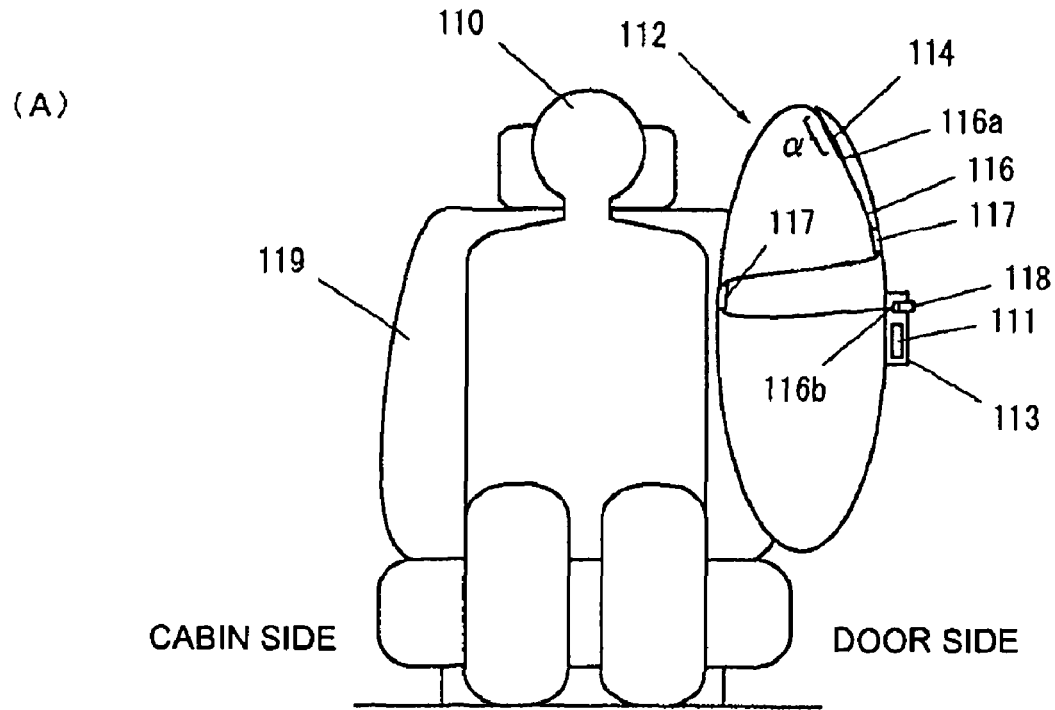
(A) CABIN SIDE / DOOR SIDE
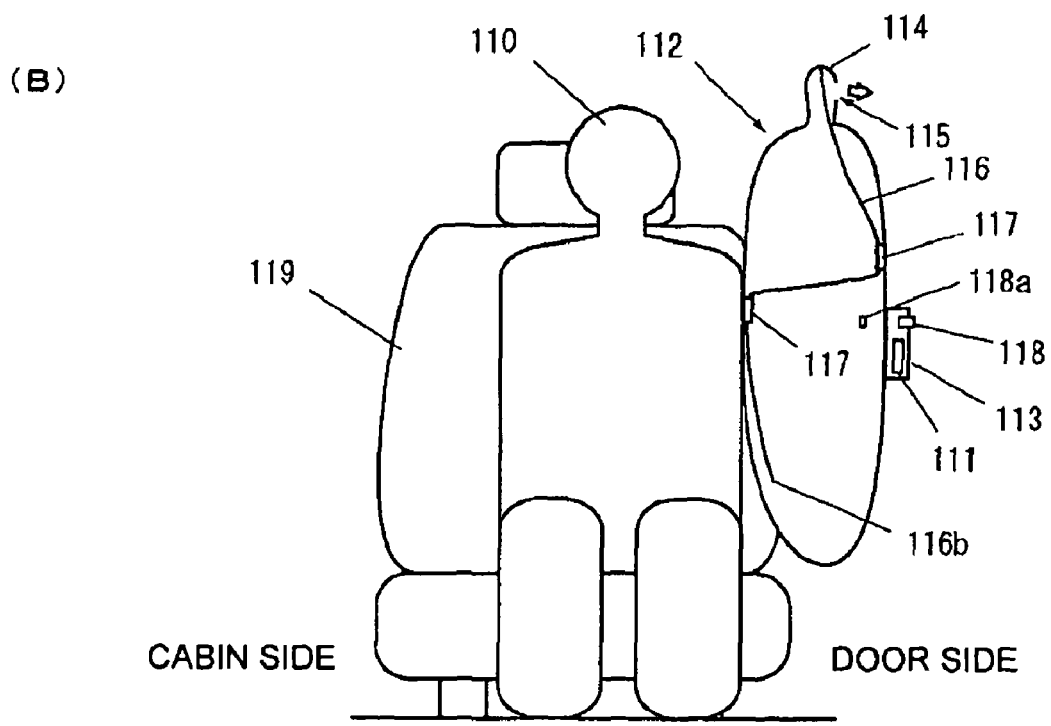
(B) CABIN SIDE / DOOR SIDE FIG. 13
(A)
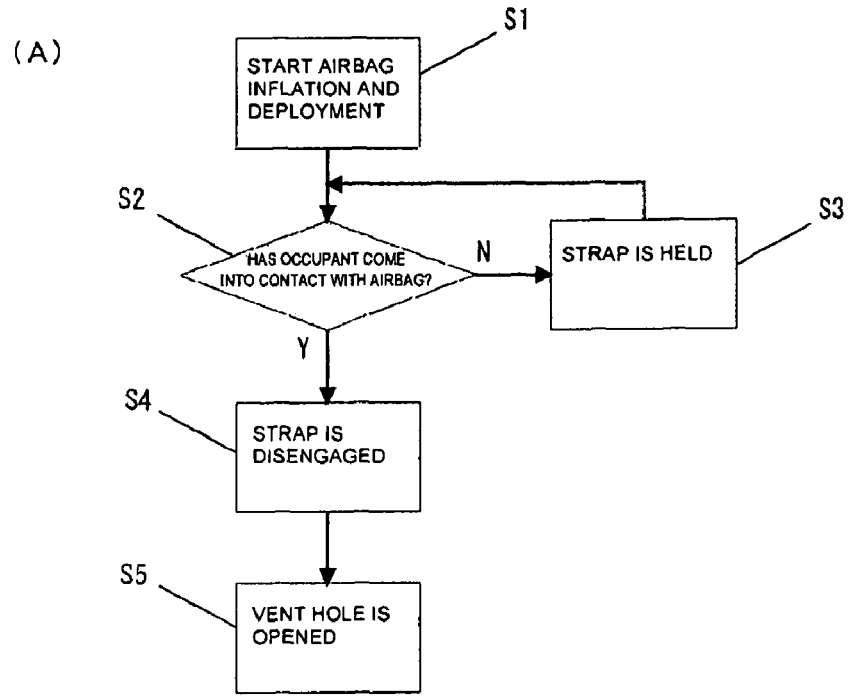
(B)
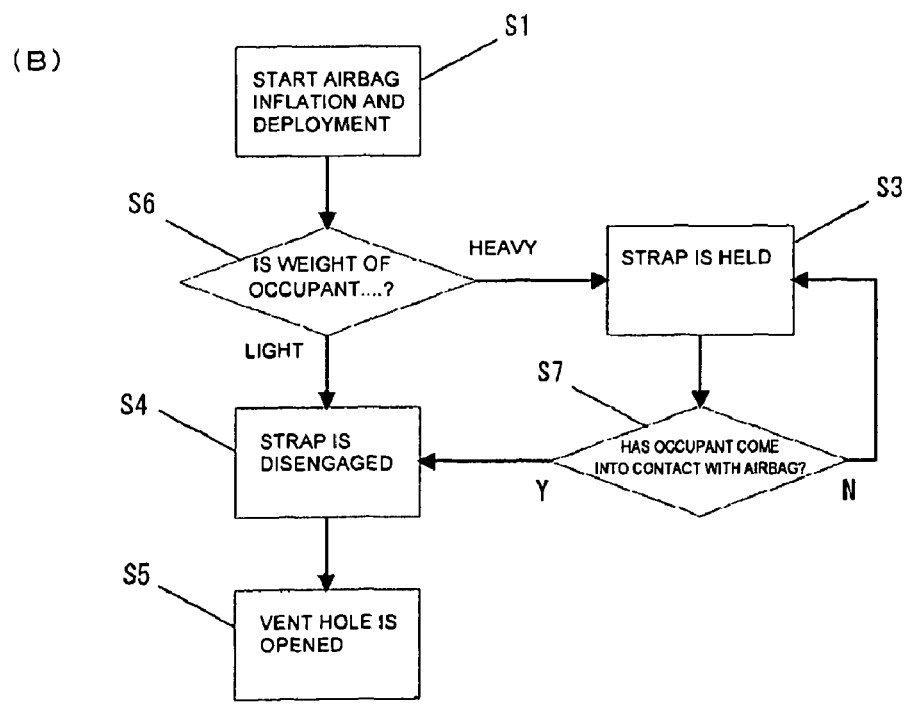

FIG. 17
(A)
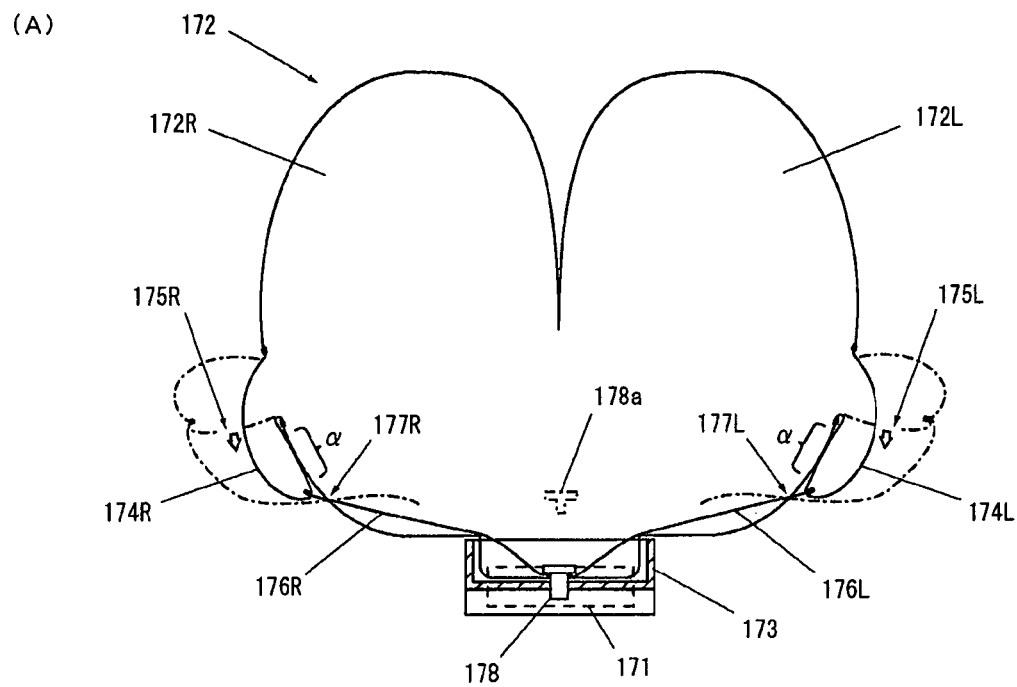
(B)
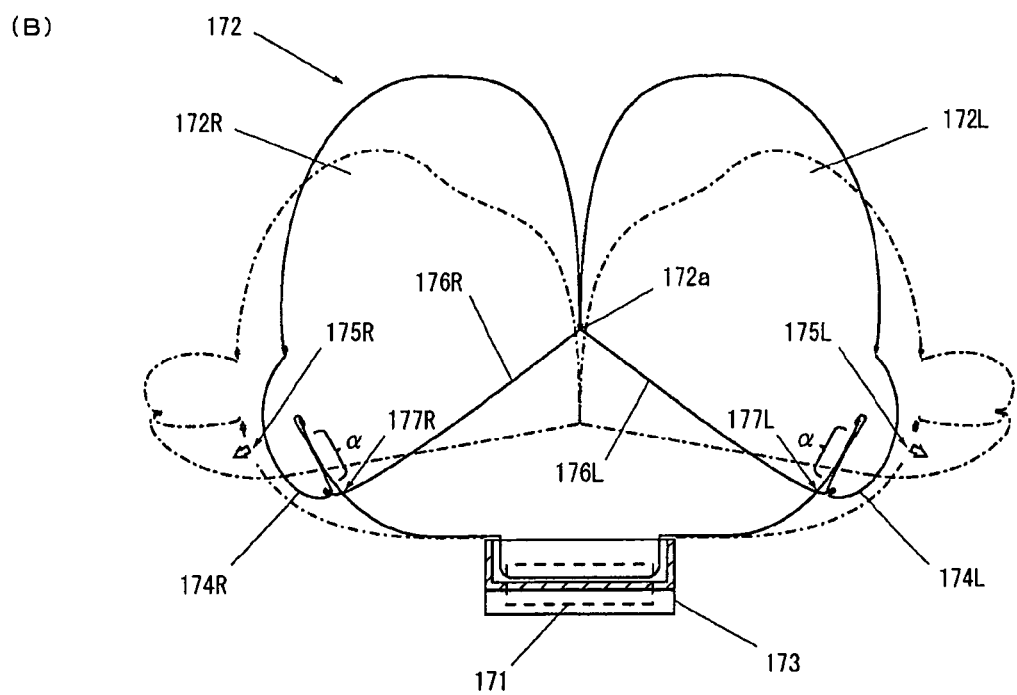

FIG. 18
(A)
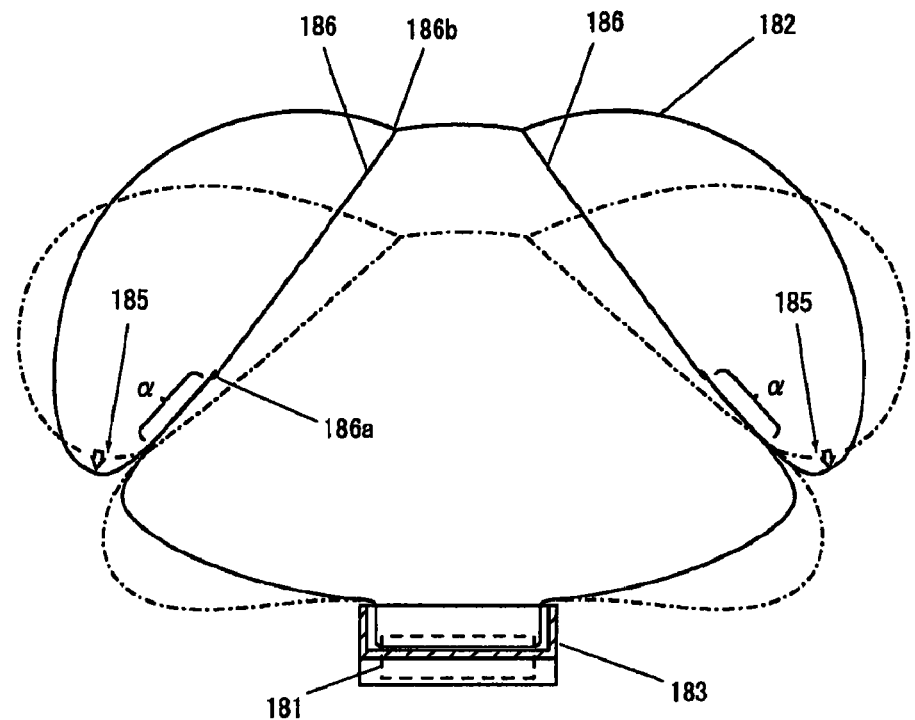
(B)
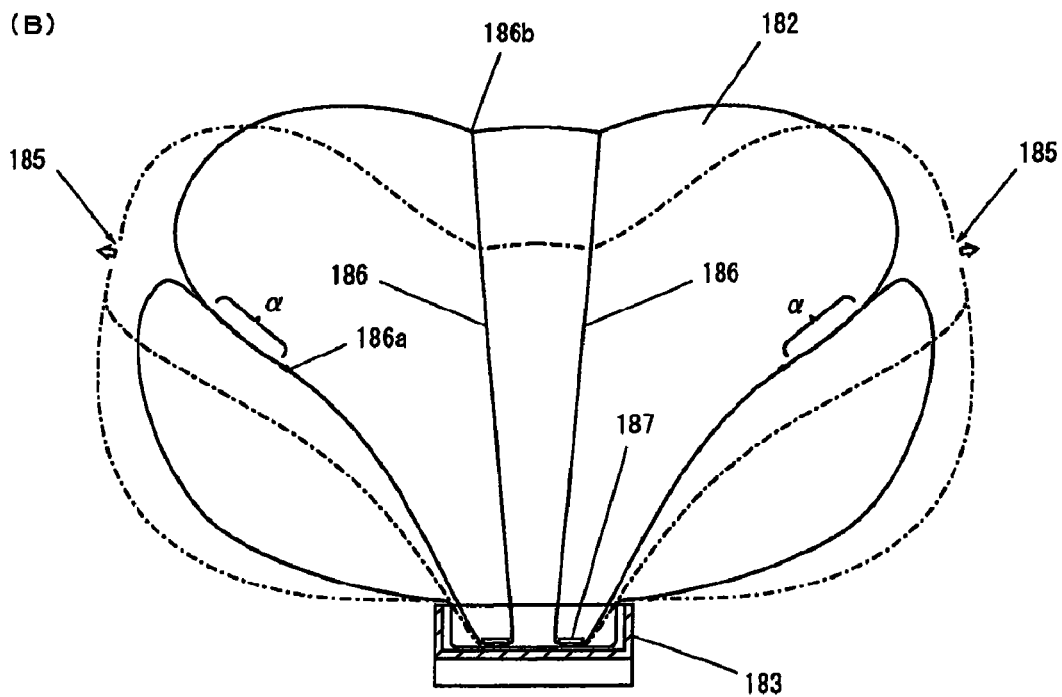

FIG. 19
(A)
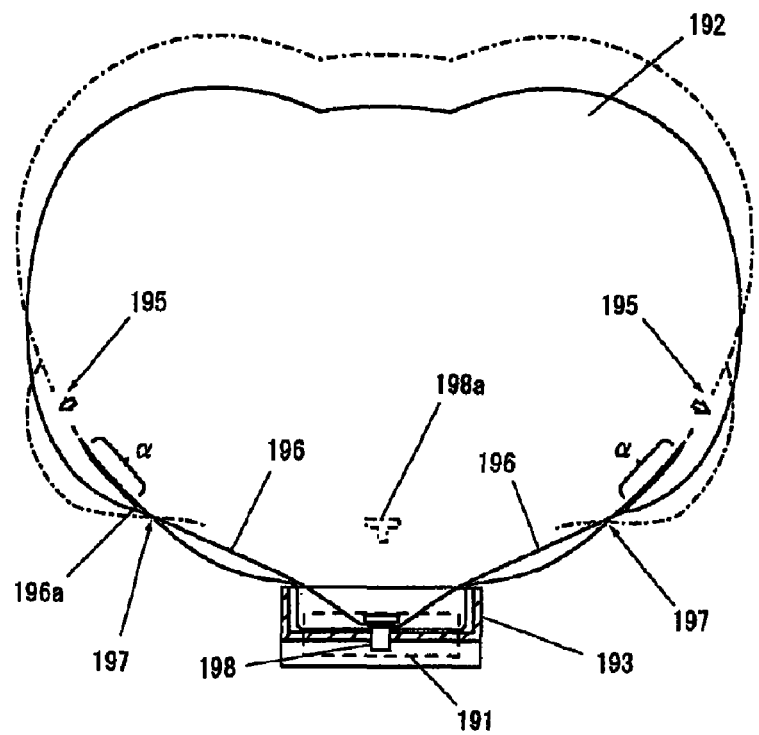
(B)
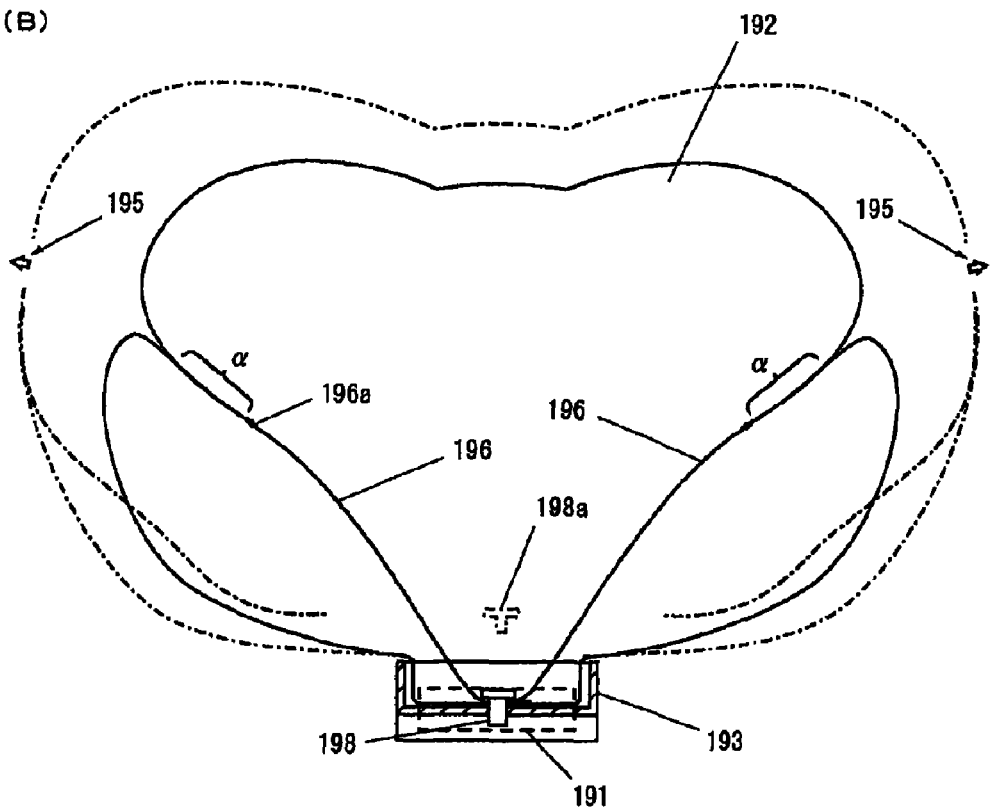

FIG. 20
(A)
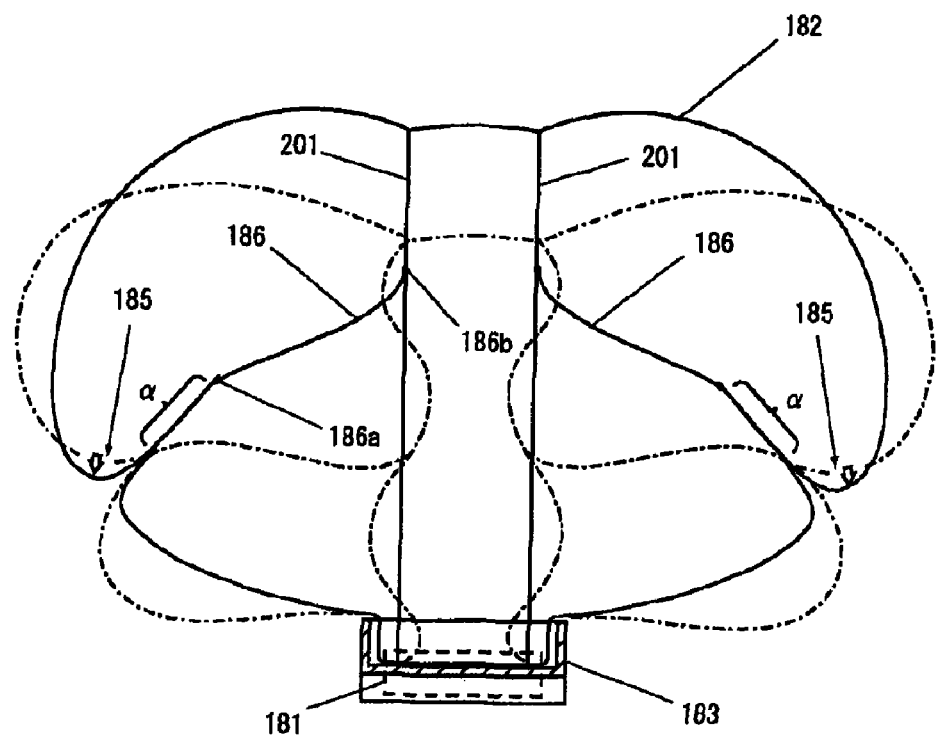
(B)
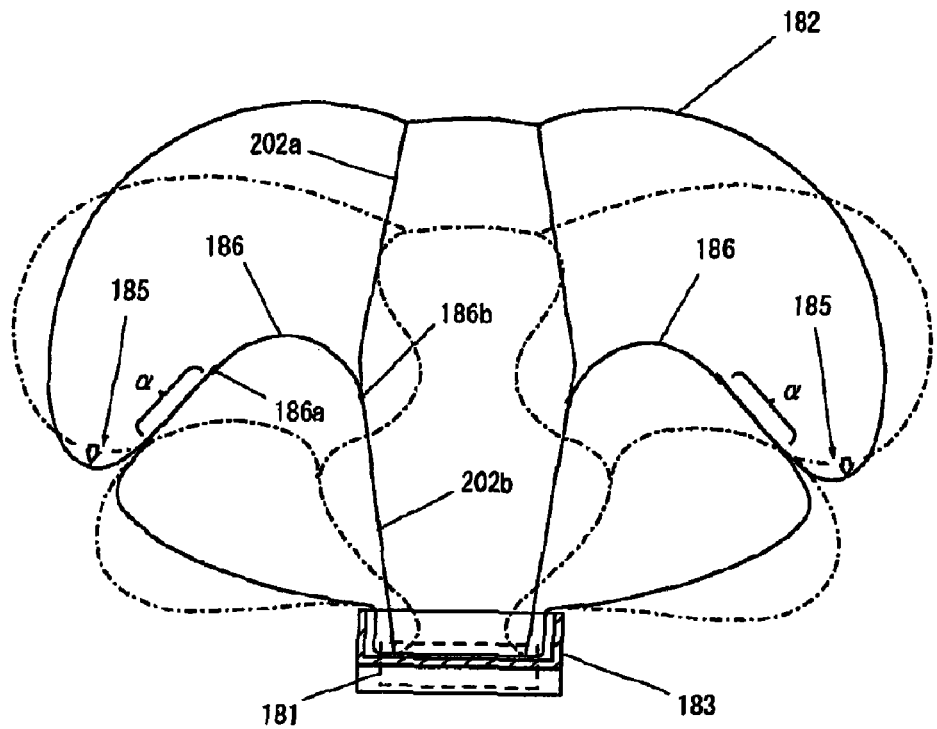

AIRBAG, AIRBAG DEVICE AND AIRBAG EXHAUSTING METHOD

TECHNICAL FIELD

The present invention relates to an airbag and an airbag apparatus mounted on a vehicle such as an automotive vehicle and an air-discharging method of the airbag and, more specifically, to an airbag, an airbag apparatus, and an air-discharging method of the airbag having a characteristic in opening-and closing means of a vent hole of the airbag.

BACKGROUND ART

Mounting an airbag apparatus configured to absorb an impact applied on an occupant by inflating and deploying an airbag in a cabin in case of collision or sudden deceleration on a vehicle such as an automotive vehicle is becoming popular. As such an airbag apparatus, various types such as a driver airbag apparatus mounted in the interior of a steering, a passenger airbag apparatus mounted in the interior of an instrument panel, side airbag apparatuses mounted in the interiors of side surface portions of a vehicle or in the interiors of seats, curtain airbag apparatuses mounted in the interiors of upper portions of doors, knee airbag apparatuses corresponding to knees of the occupants, a pedestrian airbag apparatus mounted in the interior of a portion under a hood are developed and employed. Such an airbag apparatus is generally included a gas generator configured to generate gas under predetermined conditions, an airbag configured to be inflated and deployed by being connected to the gas generator, and a retainer configured to store the airbag. Also, an outer shell which forms the airbag might be formed with an air discharge port referred to as a vent hole. The vent hole has functions to prevent an internal pressure of the airbag from becoming excessively high and to alleviate an impact by discharging gas in the airbag when the occupant comes into contact with the airbag.

In the airbag apparatus formed with the vent hole as described above, there is a problem such that the pressure loss is large since gas is discharged from the vent hole during the inflation and deployment of the airbag. As the airbag apparatus configured to solve the problem as described above, for example, those disclosed in Patent Document 1 and Patent Document 2 are already proposed.

The airbag apparatus disclosed in Patent Document 1 includes a strap secured at one end thereof to an inner peripheral surface of a ceiling portion of the airbag and secured at the other end thereof to a peripheral edge portion of a vent hole so as to close up the vent hole by being inserted therethrough from the side of the inner peripheral surface to the side of an outer peripheral surface of the airbag in the vicinity of the vent hole. This strap acts to close up the vent hole by being pulled while the airbag is being inflated and deployed, and to be loosened to open the vent hole when the occupant comes into contact with the airbag.

Also, the airbag apparatus disclosed in Patent Document 2 discloses the one in which an air-discharging tube is connected to an outer shell of the airbag (for example, FIGS. 11A, 11B) in addition to the one having the similar configuration to the one disclosed in Patent Document 1 (for example, FIG. 5). The air-discharging tube is pulled inwardly of the airbag by the strap, and the air-discharging tube is configured to be opened to the outside of the airbag and act as the vent hole when an anchor which fixes the strap is disengaged.

[Patent Document 1] Japanese Unexamined Patent Application Publication No. 6-127330
[Patent Document 2] U.S. Pat. No. 6,648,371B2

DISCLOSURE OF INVENTION

Problems to be Solved by the Invention

One of the problems to be solved by the present invention is to reduce the pressure loss during the inflation and deployment of the airbag as in Patent Document 1 and Patent Document 2, and to propose an airbag, an airbag apparatus, and an air-discharging method of the airbag having a different configuration from the configurations disclosed in Patent Document 1 or Patent Document 2.

Incidentally, in order to cause the impact absorbing capability of the airbag apparatus to be demonstrated efficiently, it is necessary to inflate and deploy the airbag and discharge gas in the airbag depending on whether the physical structure of the occupant whether size is larger or small, (specifically, whether the weight is heavy or light). For example, in the case of the occupant having a large physical structure and a heavy weight, a load applied when colliding with the airbag is large, and hence it is necessary to set the internal pressure of the airbag to a high pressure, and to reduce the amount of discharge of the gas from the vent hole. In contrast, in the case of the occupant having a small physical structure and a light weight, a load applied when colliding with the airbag is small, and hence it is necessary to set the internal pressure of the airbag to a low pressure, and to increase the amount of discharge of the gas from the vent hole. Therefore, there exists an airbag apparatus employing a two-stage system in a gas generator configured to supply gas to the airbag and configured to activate the gas generator of a first stage in the case of the occupant having a light weight and activate both gas generators in the case of the occupant having a large weight. However, as regards the discharge of the gas in the airbag, the size of the diameter of the vent hole which can accommodate the both cases is designed as a compromise plan in the status quo.

In other words, another problem to be solved by the present invention is to provide an airbag, an airbag apparatus, and an air-discharging method of the airbag which allow the impact absorbing capability of the airbag apparatus to be efficiently demonstrated according to the physical structure of the occupant.

Means for Solving the Problems

According to the present invention, there is provided an airbag configured to be inflated and deployed by being supplied with gas into the interior thereof including: a vent hole formed on the airbag; and a strap connected at one end to the airbag and at the other end to a component or a mounting component of the airbag, in which the vent hole is arranged in an area where the surface of the airbag is overlapped with each other when the airbag is pulled by the strap. Here, the vent hole is preferably opened by the deformation of the airbag.

Also, a configuration in which a protrusion which forms a portion protruding outward is provided on part of the airbag, the vent hole is formed on the protrusion or the airbag, the one end of the strap is connected to the protrusion, and the vent hole is arranged in an area where the protrusion and the airbag are overlapped with each other when the protrusion is pulled by the strap is also applicable. Here, the vent hole is preferably opened by standing upright of the protrusion. It is also possible to configure in such a manner that the internal pressure of the protrusion is increased and the protrusion stands upright by the gas flowing from the airbag into the protrusion.

A configuration in which the protrusion includes a first panel formed with the vent hole and a second panel continuously connected to the first panel, and the first panel and the second panel are seamed to a mounting hole formed on the airbag is also applicable. A configuration in which the protrusion is formed by configuring the airbag to have a front panel arranged on the side of an occupant and a rear panel arranged on the side of a vehicle structure, and seaming protruding portions formed on the outer peripheral portions of the front panel and the rear panel is also applicable.

Also, a configuration in which an outer surface of the airbag is formed with an insertion hole for guiding the other end of the strap into the interior of the airbag, and a configuration in which an inner surface of the airbag is formed with a loop for guiding the other end of the strap are also applicable. A configuration in which the airbag includes a left airbag section to be inflated and deployed on the left side of an occupant, and a right airbag section to be inflated and deployed on the right side of the occupant, and the left airbag section and the right airbag section are respectively formed with the vent hole is also applicable. Furthermore, the airbag may include a second vent hole formed at a position other than the area. The component is either one of an outer panel which forms the airbag, a tether arranged in the airbag, and an inner panel arranged in the airbag. Also, the mounting component is, for example, any one of a retainer configured to store the airbag, a back plate coupled to the retainer, and a cover coupled to the retainer.

Also, according to the present invention, in an airbag apparatus including a gas generator configured to generate gas under specific conditions; an airbag connected to the gas generator to be inflated and deployed; and a retainer configured to store the airbag, there is provided the airbag including a vent hole formed on the airbag; and a strap connected at one end to the airbag and at the other end to a component or a mounting component of the airbag, in which the vent hole is arranged in an area where the surface of the airbag is overlapped with each other when the airbag is pulled by the strap. Here, the vent hole is preferably opened by the deformation of the airbag.

Also, a configuration in which a protrusion which forms a portion protruding outward is provided on part of the airbag, the vent hole is formed on the protrusion or the airbag, the one end of the strap is connected to the protrusion, the vent hole is arranged in an area where the protrusion and the airbag are overlapped with each other when the protrusion is pulled by the strap is applicable. Here, the vent hole is preferably opened by standing upright of the protrusion. A configuration in which the internal pressure of the protrusion is increased and the protrusion stands upright by the gas flowing from the airbag into the protrusion is also applicable.

A configuration in which the protrusion includes a first panel formed with the vent hole and a second panel continuously connected to the first panel, and the first panel and the second panel are seamed to a mounting hole formed on the airbag is also applicable. Also, a configuration in which the protrusion includes a front panel arranged on the side of an occupant and a rear panel arranged on the side of a vehicle structure, and a protruding portion is formed by seaming outer peripheral portions of the front panel and the rear panel is also applicable.

Also, a configuration in which an outer surface of the airbag is formed with an insertion hole for guiding the other end of the strap into the interior of the airbag, and a configuration in which an inner surface of the airbag is formed with a loop for guiding the other end of the strap are both applicable. A configuration in which the airbag includes a left airbag section to be inflated and deployed on the left side of the occupant, and a right airbag section to be inflated and deployed on the right side of the occupant, and the left airbag section and the right airbag section are respectively formed with the vent hole is also applicable. Furthermore, the airbag may include a second vent hole formed at a position other than the area. The component is, for example, either one of an outer panel which forms the airbag, a tether arranged in the airbag, and an inner panel arranged in the airbag. Also, the mounting component is any one of a retainer configured to store the airbag, a back plate coupled to the retainer, and a cover coupled to the retainer.

The airbag apparatus may include a strap holding device configured to be able to keep the strap at a certain length and to be able to disengage the strap; and a control device configured to emit a release signal for disengaging the strap to the strap holding device.

The control device may be configured to emit the release signal when the gas generator is activated when an occupant comes into contact with the airbag or when the weight of the occupant is lighter than a predetermined reference value. The control device may be configured not to emit the release signal when the airbag includes the second vent hole and the weight of the occupant is heavier than a predetermined reference value. Also, the control device may be configured to emit the release signal substantially simultaneously when the gas generator includes a first gas generator and a second gas generator and only the first gas generator is activated. Furthermore, the control device may be configured to emit the release signal when the airbag includes the second vent hole, the gas generator includes a first gas generator and a second gas generator and both the first gas generator and the second gas generator are activated.

The strap holding device may include a cap which is engageable with an engaging hole formed on the strap, a holder which can fix the cap, a releasing device connected to the holder and being capable of releasing the fixation of the cap, and a connector receiving a release signal which activates the releasing device from the control device. Here, the releasing device may be composed of the gas generator.

Also, according to the present invention, there is provided an air-discharging method of an airbag configured to be supplied with gas in the interior thereof and inflated and deployed including: forming a vent hole on the airbag; closing the vent hole on the surface of the airbag by deforming the airbag; and discharging the gas in the airbag by opening the vent hole by deforming the airbag.

Also, according to the present invention, there is provided an air-discharging method of an airbag method of discharging air from an airbag configured to be supplied with gas in the interior thereof and inflated and deployed including: forming a protrusion protruding outward on part of the airbag; forming a vent hole on the protrusion or the airbag; closing the vent hole by pressing the protrusion against the surface of the airbag; opening the vent hole by bringing the protrusion away from the surface of the airbag; and discharging the gas in the airbag.

Advantages of the Invention

According to the airbag and the airbag apparatus in the present invention described above, by arranging the vent hole in the area where the surface of the airbag is overlapped with each other, the vent hole can be closed only by pulling the airbag by the strap. Therefore, the pressure loss during the inflation and deployment of the airbag can be reduced. Also, by configuring the vent hole to be opened by the deformation of the airbag, the opening and closing of the vent hole can be adjusted only by adjusting a tensile force of the strap. Therefore, the impact absorbing capability of the airbag can be adjusted according to the physical structure of the occupant.

Also, according to the airbag and the airbag apparatus in the present invention described above, by arranging the vent hole in the area where the airbag and the protrusion are overlapped with each other, the vent hole can be closed only by pulling the protrusion by the strap. Therefore, the pressure loss during the inflation and deployment of the airbag can be reduced. Also, by configuring the vent hole to be opened by standing upright of the protrusion, the opening and closing of the vent hole can be adjusted only by adjusting the tensile force of the strap. Therefore, the impact absorbing capability of the airbag apparatus can be adjusted according to the physical structure of the occupant. Also, by using the gas of the airbag when bringing the protrusion into an upright position, the protrusion stands upright automatically only by loosening the strap, and hence the vent hole can be opened.

Also, by configuring the protrusion with the first panel and the second panel and attaching the same to the airbag, the protrusion having the vent hole can be formed easily on the airbag. Also, when the airbag includes the front panel and the rear panel, the protrusion having the vent hole can be formed easily on the airbag also by forming the protruding portion on the front panel and the rear panel and seaming the same.

Also, by forming the insertion hole or the loop on the airbag, the strap can be guided to the predetermined connecting position and the area for closing the vent hole can be formed with ease. Also, by forming the vent holes on the respective bags of the airbag (so-called a twin airbag) having the left airbag section and the right airbag section, even in the case where the airbag is the twin airbag, the gas can be discharged effectively. Furthermore, by forming the second vent hole at a position other than the area for closing the vent hole by means of the present invention, the gas discharging amount in the airbag can be adjusted easily by opening and closing of the vent hole and the second vent hole, and the impact absorbing capability of the airbag apparatus can be demonstrated efficiently according to the physical structure of the occupant. By connecting the strap to the component of the airbag or the mounting component, the area to close the vent hole can be formed with ease.

Also, according to the airbag apparatus in the present invention described above, by providing the strap holding device and the control device, the strap can be disengaged at a given timing, and hence the gas discharging function of the vent hole can be demonstrated.

Also, by setting the timing to emit the release signal by the control device to a timing when the occupant comes into contact with the airbag, the gas in the airbag can be discharged simultaneously with the timing when the occupant comes into contact with the airbag, so that the impact absorbing capability can be demonstrated effectively while reducing the pressure loss during the inflation and deployment of the airbag. By setting the timing to emit the release signal by the control device to a timing when the gas generator of the airbag apparatus is activated when the weight of the occupant is light, the inner pressure and the gas discharging amount of the airbag can be brought into a state suitable for the occupant whose weight is light, and the impact absorbing capability of the airbag apparatus can be demonstrated efficiently. Also, by setting the control device not to emit the release signal when the airbag has the second vent hole and the weight of the occupant is heavy, the internal pressure and the gas discharging amount of the airbag can be brought into a state suitable for the occupant whose weight is heavy, and the impact absorbing capability of the airbag apparatus can be demonstrated efficiently.

Also, in a case where the gas generator of the airbag apparatus includes the first gas generator and the second gas generator, by setting the control device to emit the release signal when only the first gas generator is activated, the internal pressure and the gas discharging amount of the airbag can be brought into a state suitable for the occupant whose weight is light, and the impact absorbing capability of the airbag apparatus can be demonstrated efficiently. Also, in a case where the gas generator of the airbag apparatus includes the first gas generator and the second gas generator and the airbag includes the second vent hole, by setting the control device not to emit the release signal when both the first gas generator and the second gas generator are activated, the internal pressure and the gas discharging amount of the airbag can be brought into a state suitable for the occupant whose weight is heavy, and the impact absorbing capability of the airbag apparatus can be demonstrated efficiently.

Also, by configuring the strap holding device with the cap, the holder, the releasing device, and the connector, the strap can be disengaged at a given timing with a simple structure, so that the gas discharging function of the vent hole can be demonstrated. Also, by configuring the releasing device with the gas generator, the strap holding device can be manufactured easily and the strap holding device can be downsized.

According to the air-discharging method of the airbag in the present invention described above, by configuring the vent hole to be closed by the surface of the airbag or the protrusion, the opening and closing of the vent hole can be adjusted with ease, and the pressure loss during the inflation and deployment of the airbag can be reduced, so that the impact absorbing capability of the airbag apparatus can be demonstrated according to the physical structure of the occupant.

BEST MODES FOR CARRYING OUT THE INVENTION

Referring now to FIG. 1 to FIG. 20, an embodiment of the present invention will be described. Here, FIG. 1 is a cross-sectional side view showing a first embodiment of an airbag apparatus according to the present invention. FIG. 2 is an enlarged drawing of a protrusion, in which (A) shows a case where a vent hole has a hole shape, (B) shows a case where the vent hole has a slit shape, and (C) shows a case where the vent hole is formed at a seamed portion. FIG. 3 is a schematic cross-sectional view showing a strap holding device, in which (A) shows a pressurizing type and (B) shows a piston type.

The airbag apparatus shown in FIG. 1 includes a gas generator 1 configured to generate gas under predetermined conditions, an airbag 2 connected to the gas generator 1 and configured to be inflated and deployed, and a retainer 3 configured to store the airbag 2, and the airbag 2 includes a protrusion 4 which forms a portion protruding outward partly on the airbag 2, a vent hole 5 formed on the protrusion 4, a strap 6 connected at one end to the protrusion 4 and at the other end to the interior of the airbag 2, and an insertion hole 7 configured to guide the other end of the strap 6 into the interior of the airbag 2, and the vent hole 5 is arranged in an area where the protrusion 4 and the airbag 2 are overlapped with each other when the protrusion 4 is pulled by the strap 6. The other end of the strap 6 is connected to a strap holding device 8 configured to be able to keep the strap 6 to a certain length and to disengage the strap 6. FIG. 1 shows a state in which the vent hole 5 is closed.

Here, the airbag apparatus shown in FIG. 1 is a passenger airbag apparatus, and is stored in the interior of an instrument panel 9 arranged in front of a passenger seat. The airbag 2 is configured to start inflation and deployment when gas is supplied to the interior thereof by the activation of the gas generator 1, and to be inflated and deployed in a cabin while breaking a door portion 9a of the instrument panel 9 and being kept in contact with a front window 10. The retainer 3 is supported by hooks 3b engaged with engaging holes on a flange portion 9b formed on the instrument panel 9. The retainer 3 is fixed to an in-cabin structure in the instrument panel 9 by a fixing bracket 3c. This structure is shown as an example of the passenger airbag apparatus only, and the airbag apparatus according to the present invention is not limited to this structure.

The gas generator 1 is a part which is generally referred to as an inflator, has a substantially column shaped contour and is formed with gas injecting ports on a side peripheral surface of a distal end portion wrapped by the airbag 2. Also, the gas generator 1 is stored and fixed in a space defined by the contour of the retainer 3 and a cover 3a fixed to the retainer 3. The airbag 2 is stored in a space above the cover 3a of the retainer 3. There is a case where a back plate 3d (schematically shown in FIG. 1) is interposed between the gas generator 1 and the retainer 3 to fix the gas generator 1 to the retainer 3. Here, components relating to the attachment of the airbag 2 such as the retainer 3, the back plate 3d, and the cover 3a, are referred to as mounting components.

The gas generator 1 as described above is connected to an ECU (electronic control unit), not shown, and is controlled on the basis of a measured value of an acceleration sensor or the like. When the ECU senses or estimates a collision or a sudden deceleration of the vehicle, the gas generator 1 is ignited by an ignition current from the ECU, burns conditioner stored in the interior of the gas generator 1 to generate gas, and supplies the gas to the airbag 2. There is a case in which the gas generator 1 is configured into a two-stage system (a first gas generator and a second gas generator) in order to differentiate the case where the physical structure of an occupant is large or the weight is heavy is differentiated from the case where the physical structure of the occupant is small or the weight is light and changes the internal pressure of the airbag 2 to demonstrate the impact absorbing capability according to the difference in physical structure. When the two-stage system gas generator 1 is employed, the first gas generator in the first stage and the second gas generator in the second stage are activated simultaneously in the case where the physical structure of the occupant is large or the weight is heavy, and only the first gas generator in the first stage is activated in the case where the physical structure of the occupant is small or the weight is light. The difference in physical structure of the occupant is determined by a seat load sensor, a seat position sensor, or the like connected to the ECU.

The airbag 2 generally includes a front panel 2a arranged on the side of the occupant at the time of inflation and deployment, and a rear panel 2b arranged on the side of the instrument panel 9 (the vehicle structure). The front panel 2a and the rear panel 2b each have a substantially circular panel shape, and peripheral edge portions thereof are stitched from the inside. Therefore, the front panel 2a and the rear panel 2b form an outer shell (outer panel) as an internal pressure maintaining element of the airbag 2. Although not shown, it is also applicable to dispose a tether which forms the shape of the airbag 2 and an inner panel which partitions into a plurality of communicated chambers in the interior of the airbag 2. Here, parts which constitute the airbag 2 such as the outer panel which constitutes the outer shell of the airbag 2 (for example, the front panel 2a and the rear panel 2b), the tether, the inner panel, and parts connected thereto are referred to as components.

Then, the airbag 2 shown in FIG. 1 has the protrusion 4 which constitutes a portion protruding outward, and the vent hole 5 is formed on the protrusion 4. The protrusion 4 is preferably provided on the rear panel 2b of the airbag 2 as shown in FIG. 1. The protrusion 4 may be provided on the front panel 2a depending on the shape of the airbag 2 as a matter of course. The vent hole 5 must simply be provided in an area where the protrusion 4 and the surface of the airbag 2 overlap with each other, and the vent hole 5 may be provided on the side of the airbag 2.

Here, the structure of the protrusion 4 will be described with reference to FIG. 2. The protrusion 4 shown in FIG. 2(A) shows a state in which the vent hole 5 of the protrusion 4 shown in FIG. 1 is opened in an enlarged scale. As shown in FIG. 2(A), the protrusion 4 includes a first panel 4a formed with the vent hole 5, and a second panel 4b continuously connected to the first panel 4a, and the first panel 4a and the second panel 4b are seamed to a mounting hole 2c formed on the airbag 2. More specifically, the first panel 4a and the second panel 4b are seamed with seam allowances 4c formed on respective peripheral edge portions overlapped with each other. The first panel 4a and the second panel 4b are seamed with seam allowances 4d formed on respective hem portions and the peripheral edge portion of the mounting hole 2c overlapped with each other. Therefore, the internal space of the protrusion 4 formed by the first panel 4a and the second panel 4b communicates with the airbag 2 via the mounting hole 2c. The strap 6 is sandwiched at the seamed portion of the peripheral edge portions of the first panel 4a and the second panel 4b, and is seamed together. At this time, the position to seam the strap 6 is preferably a portion near the top of the protrusion 4 in order to press the first panel 4a formed with the vent hole 5 against the surface of the airbag 2 in an well balanced manner. According to the protrusion 4 having the configuration as described above, when the strap 6 is disengaged, gas in the airbag 2 flows into the internal space of the protrusion 4, and the internal pressure in the protrusion 4 is increased, so that the protrusion 4 stands upright on the surface of the airbag 2, and the vent hole 5 is brought into an opened state, whereby the gas in the airbag 2 can be discharged from the vent hole 5. The number of the protrusion 4 is arbitrary. However, as described in conjunction with FIG. 4 to FIG. 7, it is generally provided at two positions both on the left and right sides.

Also, the vent hole 5 shown in FIG. 2(A) has a round-hole shape formed by cutting part of the surface of the first panel 4a which constitutes the protrusion 4. As a matter of course, the vent hole 5 may be formed into a square hole shape or a slot shape. The size of the vent hole 5 is designed arbitrarily according to the size of the airbag 2 or the like. Here, the remaining part of the first panel 4a between the vent hole 5 and the peripheral edge portion thereof preferably has a width of, for example, 10 mm or more in order to improve the sealing property when the vent hole 5 is closed (when the protrusion 4 is pressed against the surface of the airbag 2 by a tensile force of the strap 6).

Also, the vent hole 5 of the protrusion 4 shown in FIG. 2(B) has a slit shape formed by incising part of the surface of the first panel 4a which constitutes the protrusion 4. In this manner, even when the vent hole 5 is formed into a slit shape, the slit assumes an opened state due to the internal pressure of the protrusion 4, and the same action as the vent hole 5 shown in FIG. 2(A) is achieved. Other portions are basically the same as the one shown in FIG. 2(A), and hence detailed description will be omitted.

Also, the protrusion 4 shown in FIG. 2(C) is formed with the vent hole 5 having a slit shape by forming a non-seamed portion at part of the seamed portion between the first panel 4a and the second panel 4b which constitute the contour of the protrusion 4. In this manner, even when the vent hole 5 in a slit shape is formed on the surface of the protrusion 4, the slit assumes an opened state due to the internal pressure of the protrusion 4, and the same action as the vent hole 5 shown in FIG. 2(A) is achieved. The protrusion 4 shown in FIG. 2(C) is formed with the vent hole 5 at the seamed portion between the first panel 4a and the second panel 4b, the protrusion 4 shown in FIG. 2(A) is attached to the airbag 2 in a state in which the protrusion 4 shown in FIG. 2(A) is rotated by 90° along the mounting hole 2c. Other portions are basically the same as the one shown in FIG. 2(A), and hence detailed description will be omitted.

Also, the airbag 2 shown in FIG. 1 has the insertion hole 7 for guiding the strap 6 connected to the protrusion 4 into the interior. Here, the strap 6 is formed of a cord member or a woven fabric material and, for example, is formed of the tether generally used for the airbag apparatus or a webbing used for the seat belt apparatus. The insertion hole 7 may have the size and shape which allow passage of the strap 6, and may either be a hole shape or a slip shape. The strap 6 guided from the exterior of the airbag 2 into the interior thereof via the insertion hole 7 is connected to the strap holding device 8 as shown in FIG. 1. The strap holding device 8 is fixed to the retainer 3, and hence the strap 6 is connected to the retainer 3 via the strap holding device 8. Finally, the other end of the strap 6 may be joined to an inner surface of the airbag 2 as described in the description in conjunction with FIG. 4, FIG. 6, and FIG. 7. Although not shown, it is also applicable to provide a belt loop on an outer peripheral surface of the airbag 2, guide the strap 6 toward the retainer 3 along the outer peripheral surface of the airbag 2, and fix the end portion thereof to the airbag 2 or the retainer 3.

Here, referring now to FIG. 3, the structure of the strap holding device 8 will be described. The strap holding device 8 shown in FIG. 3(A) and FIG. 3(B) includes a cap 31 which is engageable with an engaging hole 6c formed on the strap 6, a holder 32 which can fix the cap 31, a releasing device 33 connected to the holder 32 and being capable of releasing the fixation of the cap 31, and a connector 35 receiving a release signal which activates the releasing device 33 from a control device 34. The control device 34 may be the ECU (electronic control unit) which controls the gas generator 1 or may be the one specific for the strap holding device 8.

The strap holding device 8 shown in FIG. 3(A) includes a projection 31a formed on an outer peripheral surface of the cap 31, and a substantially L-shaped groove 32a formed on an inner peripheral surface of the holder 32, and the cap 31 is fixed to the holder 32 by engaging the projection 31a with the groove 32a. In the interior of the holder 32, a micro gas generator (hereinafter, referred to as "MGG") which constitutes the releasing device 33 is embedded. The inner peripheral surface of the holder 32 and an outer peripheral surface of the releasing device 33 (MGG) are each formed with a thread, and the releasing device 33 (MGG) is fixed to the holder 32 by engaging the threads. Also, a shouldered portion is formed in the interior of the holder 32, and a predetermined clearance 32b is formed between the cap 31 and the releasing device 33 (MGG) by bringing the releasing device 33 (MGG) into abutment with the shouldered portion. The cap 31 is pressurized by blowing gas into the clearance 32b from a distal end portion of the releasing device 33 (MGG) to separate the projection 31a from the groove 32a, or shear the projection 31a, so that the cap 31 is opened from the holder 32. In this manner, the strap holding device 8 configured to pressurize the cap 31 directly by the releasing device 33 (MGG) to open the same is referred to as a pressurizing type.

The MGG is a compact gas generator, and basically has the same structure as the gas generator 1. In other words, the MGG is ignited by an ignition current (release signal) from the control device 34, and burns conditioner stored in the interior thereof to generate gas. Also, the connector 35 is fixed to a depression at a rear end portion of the releasing device 33 (MGG) by pushing-in or screwing, so that the ignition current (release signal) from the control device 34 is transmitted to the releasing device 33 (MGG). The connector 35 and the control device 34 are electrically connected by a harness 36. A flange portion 32c is formed at a midsection of the holder 32, and the holder 32 is fixed to the retainer 3 by connecting the flange portion 32c and the retainer 3 with a fixture 37 such as a bolt and a nut.

The strap holding device 8 shown in FIG. 3(B) is different from the strap holding device 8 shown in FIG. 3(A) in a method of fixing the cap 31 and the structure of the releasing device 33. The releasing device 33 shown in FIG. 3(B) includes a case 33a continuously connected to the holder 32, a MGG 33b fixed to the case 33a, a piston 33c arranged slidably in the case 33a, a spring 33d configured to couple the piston 33c with the case 33a, and a pin 33e connected to a distal end of the piston 33c. The piston 33c is stored in a substantially cylindrical cylinder portion 33f formed in the case 33a, and is urged in the direction to cause the pin 33e to project by the action of the spring 33d. A clearance 33g is defined between the MGG 33b and the piston 33c, and gas in the MGG 33b is supplied to the clearance 33g. The cap 31 is formed with a retaining hole 31b which allows insertion of the pin 33e. An outer peripheral surface of the holder 32 is formed with an engaging hole 32d for supporting a distal end of the pin 33e inserted through the retaining hole 31b. Therefore, before the gas is supplied to the clearance 33g, the cap 31 can be held by the pin 33e. Then, when the gas is supplied to the clearance 33g, the gas presses the piston 33c, slides the piston 33c in the direction to cause the pin 33e to pull, so that the pin 33e is pulled out from the cap 31 and hence the cap 31 is opened. Other portions are basically the same as the one shown in FIG. 3(A), and hence detailed description will be omitted. In this manner, the strap holding device 8 configured to pressurize the piston 33C by the releasing device 33 (MGG) to open the cap 31 is referred to as a piston type.

Subsequently, referring now to FIG. 4 and FIG. 5, the action of the strap holding device 8 will be described. Here, FIG. 4 is an explanatory drawing showing an action of the strap holding device in a case where the end portion of the strap is fixed to the airbag, in which (A) shows a state in which the vent hole is closed, and (B) shows a state in which the vent hole is opened. FIG. 5 is an explanatory drawing showing an action of the strap holding device in a case where the end portion of the strap is connected to the strap holding device, in which (A) shows a state in which the vent hole is closed, and (B) shows a state in which the vent hole is opened.

An airbag apparatus shown in FIG. 4(A) and FIG. 4(B) is formed with the protrusions 4, 4 on both left and right sides of the airbag 2. The straps 6 connected at end portions 6a to the respective protrusions 4 are guided into the interior of the airbag 2 via the respective insertion holes 7, and are connected to the strap holding device 8, and then the respective end portions 6b are seamed to the inner surface of the airbag 2. Provided between the strap holding device 8 and the each end portion 6b is a slack to an extent which allows the each protrusion 4 to stand upright on the airbag 2 in a case where the strap holding device 8 is released and the respective straps 6 are disengaged. In FIG. 4(A) and FIG. 4(B), illustration of the gas generator fixed to the retainer 3 is omitted.

As shown in FIG. 4(A), when closing of the respective vent holes is wanted, the strap holding device 8 may be set so as not to be activated. As the airbag 2 is inflated and deployed, the respective straps 6 are brought into a state of being pulled by the protrusions 4. When the straps 6 are completely tensed, the protrusions 4 are pulled by the straps 6, and are pressed against areas α on the surface of the airbag 2. At this time, the respective protrusions 4 are pressed outward by the internal pressure of the airbag 2, and press the portions of the panel on the peripheral edge portions of the vent holes 5 toward the airbag 2 by the gas flowed into the protrusions 4. Therefore, the vent holes 5 can be closed by the surface of the airbag 2 only by keeping the lengths of the straps 6 at a certain length at the time of inflation and deployment of the airbag 2 at the time of inflation and deployment of the airbag 2, so that the discharge of gas can be restrained. The same action is achieved also in a case where the vent holes 5 are provided on the areas α on the side of the airbag 2.

Also, as shown in FIG. 4(B), what has to be done when opening of the respective vent holes 5 is wanted is to activate the strap holding device 8 and disengage the respective straps 6. When the strap holding device 8 is activated and the cap 31 is opened, the straps 6 engaged with the strap holding device 8 are disengaged. Then, a tensile force which has been pulling the protrusions 4 is lowered, and the protrusions 4 assume an upright state on the surface of the airbag 2 because the internal pressures in the protrusions 4 are increased by the gas flowing therein, so that the vent holes 5 are brought into an opened state, and the gas in the airbag 2 can be discharged. The same action is achieved also in the case where the vent holes 5 are provided on the areas α on the side of the airbag 2.

The airbag apparatus shown in FIG. 5(A) and FIG. 5(B) is configured in such a manner that the end portions 6b of the respective straps 6 are connected to the strap holding device 8, instead of connecting to the airbag 2. Other portions are basically the same as the one shown in FIG. 4(A) and FIG. 4(B), and hence detailed description will be omitted. As shown in FIG. 5(A), when closing of the respective vent holes 5 is wanted, the strap holding device 8 may be set so as not to be activated. As shown in FIG. 5(B), what has to be done when opening of the vent holes 5 is wanted is to activate the strap holding device 8 and disengage the respective straps 6. In this case, since the end portions 6b of the respective straps 6 are not connected to any point, they are subjected to a loss of tensile force, and the protrusions 4 assume an upright state on the surface of the airbag 2 because the internal pressures in the protrusions 4 are increased by the gas flowing therein, so that the vent holes 5 are brought into an opened state, so that the gas in the airbag 2 can be discharged.

Subsequently, the airbag apparatus which does not employ the strap holding device which holds and disengages the strap positively will be described with reference to FIG. 6 and FIG. 7. Here, FIG. 6 shows rough cross-sectional views showing a second embodiment of the airbag apparatus according to the present invention, in which (A) shows a state in which the vent hole is closed, and (B) shows a state in which the vent hole is opened. FIG. 7 shows rough cross-sectional views showing a modification of the second embodiment, in which (A) shows a state in which the vent hole is closed, and (B) shows a state in which the vent hole is opened.

The airbag apparatus shown in FIG. 6(A) and FIG. 6(B) is formed with protrusions 64, 64 on both left and right sides of an airbag 62. Straps 66 connected at end portions 66a to the respective protrusions 4 are guided into the interior of the airbag 62 via respective insertion holes 67, and then end portions 66b of the respective straps 66 are seamed to an inner surface of the airbag 62. Since the end portions 66b of the straps 66 are connected to the airbag 62 on the side of a top portion, the protrusions 64 are attached to the airbag 62 in the direction opposite from FIG. 4 and FIG. 5. The straps 66 may be composed on one strap and, in this case, an intermediate portion of the strap is seamed to the airbag 62. Although a case where vent holes 65 are formed on the respective protrusions 64 are illustrated here, the vent holes 65 must simply be provided on the area a where the protrusions 64 and the surface of the airbag 62 are overlapped with each other, and the vent holes 65 may be provided on the side of the airbag 62.

As shown in FIG. 6(A), when a gas generator 61 is activated and the airbag 62 is inflated and deployed, the respective straps 66 are brought into a pulled state in association with the movement of the top portion of the airbag 62. Then, the respective straps 66 pull the protrusions 64, and hence the vent holes 65 are pressed against the areas α on the surface of the airbag 62. At this time, the protrusions 64 are pressed outward by the internal pressure of the airbag 62, and press the panel on peripheral edge portions of the vent holes 65 toward the airbag 62 by the gas flowed into the protrusions 64. Therefore, the vent holes 65 can be closed by the surface of the airbag 62 only by keeping the lengths of the straps 66 at a certain length at the time of inflation and deployment of the airbag 62, so that the discharge of gas can be restrained. The same action is achieved also in a case where the vent holes 65 are provided on the areas α on the side of the airbag 62.

As shown in FIG. 6(B), when an occupant 60 comes into contact with the airbag 62, the top portion of the airbag 62 is moved toward a retainer 63, and the respective straps 66 assume a loosened state, whereby tensile forces of the straps 66 are lowered. Simultaneously, gas flows into the interiors of the respective protrusions 64 and the internal pressure is increased by the pressure fluctuation caused by deformation of the airbag 62. With these actions, the respective protrusions 64 assume an upright state on the surface of an airbag 62, the respective vent holes 65 are opened, and hence the gas in the airbag 62 can be discharged. The same action is achieved also in the case where the vent holes 65 are provided on the areas α on the side of the airbag 62.

The airbag apparatus shown in FIG. 7(A) and FIG. 7(B) is configured in such a manner that protrusions 74, 74 are inverted in direction of attachment to the airbag 62 and are attached in the same direction as those shown in FIG. 4 and FIG. 5. Therefore, vent holes 75 are opened and closed in the direction toward the retainer 63. In this case, the position of an insertion hole 77 is arranged on the side of the retainer 63. Other portions are basically the same as the one shown in FIG. 6(A) and FIG. 6(B), and hence detailed description will be omitted. As shown in FIG. 7(A), the vent holes 75 are pulled by the straps 66 and hence assume a closed state when the airbag 62 is inflated and deployed. As shown in FIG. 7(B), when the occupant 60 comes into contact with the airbag 62, the tensile force of the straps 66 are lowered, and the respective protrusions 74 assume an upright state on the surface of the airbag 62 because the internal pressures in the interior of the respective protrusions 74 are increased by the gas flowing therein, so that the respective vent holes 75 are opened, and the gas in the airbag 62 can be discharged. The same action is achieved also in a case where the vent holes 75 are provided on the areas α on the side of the airbag 62.

Subsequently, referring now to FIG. 8, a case where the present invention is applied to a driver airbag apparatus will be described. FIG. 8 is an explanatory drawing showing a third embodiment of the airbag apparatus according to the present invention, in which (A) is a back view and (B) is a side cross-sectional view. In FIG. 8(A) and FIG. 8(B), a state in which a vent hole 85 is opened is shown by a solid line and a state in which the vent hole 85 is closed is shown by a long and short dash line.

The airbag apparatus shown in FIG. 8(A) and FIG. 8(B) includes a gas generator 81 configured to generate gas under predetermined conditions, an airbag 82 connected to the gas generator 81 and configured to be inflated and deployed, and a retainer 83 configured to store the airbag 82, and the airbag 82 includes a protrusion 84 which forms a portion protruding outward partly on the airbag 82, the vent hole 85 formed on the protrusion 84, a strap 86 connected at an end portion 86a at one end to the protrusion 84 and an end portion 86b at the other end to the interior of the airbag 82, and an insertion hole 87 configured to guide the other end of the strap 86 into the interior of the airbag 82, and the vent hole 85 is arranged in an area α where the protrusion 84 and the airbag 82 are overlapped with each other when the protrusion 84 is pulled by the strap 86. The end portion 86b of the strap 86 is connected to a strap holding device 88 configured to be able to keep the strap 86 to a certain length and to disengage the strap 86. Although the case where the vent hole 85 is formed on the protrusion 84 is illustrated here, the vent hole 85 must simply be provided on the area α where the protrusion 84 and the surface of the airbag 82 are overlapped with each other, and the vent hole 85 may be provided on the side of the airbag 82.

The airbag apparatus according to the third embodiment is characterized in that the airbag 82 includes a front panel 82a arranged on the occupant side and a rear panel 82b arranged on the vehicle structure side, and the protrusion 84 is formed by seaming protruding portions 84a, 84b formed on outer peripheral portions of the front panel 82a and the rear panel 82b. The airbag apparatus shown in FIG. 8 is a driver airbag apparatus and, is generally stored in a center portion of a steering wheel (not shown). Therefore, although it is different from the airbag apparatus shown in FIG. 1 in the shapes of the gas generator 81 or the retainer 83, the basic structure as the airbag apparatus is the same and detailed description of other portions will be omitted.

In the airbag apparatus shown in FIG. 8, the vent hole 85 can be closed by holding the strap 86 by the strap holding device 88, and the strap 86 can be disengaged by opening a cap 88a of the strap holding device 88, and hence the vent hole 85 can be opened. Here, a case where the protrusion 84 is provided at one position has been described, the protrusion 84 may be formed at two positions; left and right or top and bottom, and the protrusion 84 may be formed at three or more portions. As the method of fixing the end portion 86b of the strap 86, the one shown in FIG. 4 may be employed.

Subsequently, the driver airbag apparatus which does not employ the strap holding device which holds and disengages the strap positively will be described with reference to FIG. 9. FIG. 9 is an explanatory drawing showing a fourth embodiment of the airbag apparatus according to the present invention, in which (A) is a back view and (B) is a side cross-sectional view. In FIG. 9(A) and FIG. 9(B), a state in which a vent hole 95 is closed is shown by a solid line and a state in which the vent hole 95 is opened is shown by a long and short dash line.

The airbag apparatus shown in FIG. 9(A) and FIG. 9(B) includes a gas generator 91 configured to generate gas under predetermined conditions, the airbag 92 connected to the gas generator 91 and configured to be inflated and deployed, and a retainer 93 configured to store the airbag 92, and the airbag 92 includes a protrusion 94 which forms a portion protruding outward partly on the airbag 92, the vent hole 95 formed on the protrusion 94, a strap 96 connected at an end portion 96a at one end to the inner side of the protrusion 94 and an end portion 96b at the other end to the interior of the airbag 92, and a loop 97 configured to guide the other end of the strap 96 into the interior of the airbag 92, and the vent hole 95 is arranged in an area α where the protrusion 94 and the airbag 92 are overlapped with each other when the protrusion 94 is pulled by the strap 96. Although a case where the vent holes 95 are formed on the protrusions 94 are illustrated here, the vent holes 95 must simply be provided on the area α where the protrusions 94 and the surface of the airbag 92 are overlapped with each other, and the vent holes 95 may be provided on the side of the airbag 92. The loop 97 is formed of a panel-shaped woven fabric material, and is formed with a clearance for allowing passage of the strap 96 therethrough at a midsection by seaming both ends thereof with the airbag 92.

The airbag apparatus according to a fourth embodiment is configured in such a manner that the airbag 92 includes a front panel 92a arranged on the occupant side and a rear panel 92b arranged on the vehicle structure side, and the protrusion 94 is formed by seaming protruding portions 94a, 94b formed on outer peripheral portions of the front panel 92a and the rear panel 92b. The strap 96 is configured to pull the protrusion 94 from the inside, and is guided by the loop 97 seamed to the airbag 92 in the vicinity of a top portion. The airbag apparatus shown in FIG. 9 is a driver airbag apparatus, and although it is different from the airbag apparatus shown in FIG. 1 in the shapes of the gas generator 91 or the retainer 93, the basic structure as the airbag apparatus is the same and detailed description of other portions will be omitted.

As shown in FIG. 9(A) and FIG. 9(B) by a solid line, when the gas generator 91 is activated and the airbag 92 is inflated and deployed, the respective straps 96 are brought into a pulled state in association with the movement of the top portion of the airbag 92. Then, the respective straps 96 pull the protrusion 94, and hence pull the protrusion 94 inward of the airbag 92. At this time, the vent hole 95 is pressed against the area α where the surface of the retracted protrusion 94 and the surface of the airbag 92 are overlapped with each other. Therefore, the vent hole 95 can be closed only by keeping the lengths of the strap 96 at a certain length at the time of inflation and deployment of the airbag 92, so that the discharge of gas can be restrained. The same action is achieved also in a case where the vent holes 95 are provided on the areas α on the side of the airbag 92.

As shown in FIG. 9(A) and FIG. 9(B) by a long and short dash line, when the occupant (not shown) comes into contact with the airbag 92, the top portion of the airbag 92 is moved toward the retainer 93, and the strap 96 assumes a loosened state, whereby a tensile force is lowered. Simultaneously, gas flows into the interior of the protrusion 94 and the internal pressure is increased by the pressure fluctuation caused by deformation of the airbag 92. With these actions, the protrusion 94 assumes an upright state on the surface of the airbag 92, the vent hole 95 is opened, and hence the gas in the airbag 92 can be discharged. The same action is achieved also in the case where the vent holes 95 are provided on the areas α on the side of the airbag 92.

Subsequently, referring now to FIG. 10 and FIG. 11, a case where the present invention is applied to a side-collision airbag apparatus will be described. Here, FIG. 10 is a rough cross-sectional view showing a fifth embodiment of the airbag apparatus according to the present invention, in which (A) shows a state in which the vent hole is closed, (B) shows a state in which the vent hole is opened, and (C) shows a modification.

The airbag apparatus shown in FIG. 10(A) and FIG. 10(B) includes a gas generator 101 configured to generate gas under predetermined conditions, an airbag 102 connected to the gas generator 101 and configured to be inflated and deployed, and a retainer 103 configured to store the airbag 102, and the airbag 102 includes a protrusion 104 which forms a portion protruding outward partly on the airbag 102, a vent hole 105 formed on the protrusion 104, a strap 106 connected at an end portion 106a at one end to the inner side of the protrusion 104 and an end portion 106b at the other end to the interior of the airbag 102, and a loop 107 configured to guide the other end of the strap 106 into the interior of the airbag 102, and the vent hole 105 is arranged in an area α where the protrusion 104 and the airbag 102 are overlapped with each other when the protrusion 104 is pulled by the strap 106. Although a case where the vent holes 105 are formed on the protrusions 104 are illustrated here, the vent holes 105 must simply be provided on the area α where the protrusions 104 and the surface of the airbag 102 are overlapped with each other, and the vent holes 105 may be provided on the side of the airbag 102. Here, although a case where the end portion 106b of the strap 106 is connected to the airbag 102 on the side of a top portion and the loop 107 is arranged on the side of the retainer 103 has been illustrated, as shown in FIG. 9(B), it is also possible to connect the end portion 106b to the retainer 103 side and arrange the loop 107 on the side of the top portion of the airbag 102. The retainer 103 is generally arranged on a door portion of the vehicle or on a side surface portion of the seat.

As shown in FIG. 10(A), when the gas generator 101 is activated and the airbag 102 is inflated and deployed, the strap 106 is brought into a pulled state via the loop 107 in association with the movement of the top portion of the airbag 102. Then, the strap 106 pulls the protrusion 104, and hence the protrusion 104 is pulled inward of the airbag 102. At this time, the vent hole 105 is pressed against the area α where the surface of the retracted protrusion 104 and the surface of the airbag 102 are overlapped with each other. Therefore, the vent hole 105 can be closed only by keeping the lengths of the strap 106 at a certain length at the time of inflation and deployment of the airbag 102, so that the discharge of gas can be restrained. The same action is achieved also in a case where the vent holes 105 are provided on the areas α on the side of the airbag 102. Here, an occupant 100 is seated on a seat 109, and FIG. 10(A) shows a state before the occupant 100 collides with the airbag 102. Although the occupant 100 generally fastens the seatbelt, illustration is omitted here.

As shown in FIG. 10(B), when the occupant 100 comes into contact with the airbag 102, the top portion of the airbag 102 moves toward the retainer 103, so that the strap 106 assumes a loosened state and a tensile force is lowered. Simultaneously, gas flows into the interior of the protrusion 104 and the internal pressure is increased by the pressure fluctuation caused by deformation of the airbag 102. With these actions, the protrusion 104 assumes an upright state on the surface of the airbag 102, the vent hole 105 is opened, and hence the gas in the airbag 102 can be discharged. Although the protrusion 104 is provided at one position here, it may be provided at a plurality of positions. The same action is achieved also in the case where the vent holes 105 are provided on the areas α on the side of the airbag 102.

FIG. 10(C) is a modification of the airbag apparatus shown in FIG. 10(A) and FIG. 10(B), and the method of connecting the strap 106 is different. In the airbag apparatus shown in FIG. 10(C), the loops 107 are arranged at two positions; on the side of the top portion and on the side of the retainer 103 of the airbag 102, and the strap 106 is passed through the respective loops 107 and the end portion 106b is connected to the retainer 103. By attaching the strap 106 in this manner, the amount of loosening of the strap 106 when the occupant 100 comes into contact with the airbag 102 becomes two times the amount of the movement of the top portion of the airbag 102 toward the retainer 103, so that a room is given to the movement of the protrusion 104 to the upright position.

Subsequently, the side-collision airbag apparatus provided with the strap holding device will be described. Here, FIG. 11 is a rough cross-sectional view showing a sixth embodiment of the airbag apparatus according to the present invention, in which (A) shows a state in which the vent hole is closed, and (B) shows a state in which the vent hole is opened.

The airbag apparatus shown in FIG. 11(A) and FIG. 11(B) includes a gas generator 111 configured to generate gas under predetermined conditions, an airbag 112 connected to the gas generator 111 and configured to be inflated and deployed, and a retainer 113 configured to store the airbag 112, and the airbag 112 includes a protrusion 114 which forms a portion protruding outward partly on the airbag 112, a vent hole 115 formed on the protrusion 114, a strap 116 connected at an end portion 116a at one end to the inner side of the protrusion 114 and an end portion 116b at the other end to the interior of the airbag 112, and loops 117, 117 configured to guide the end portion 116b of the strap 116 into the interior of the airbag 112, and the vent hole 115 is arranged in an area α where the protrusion 114 and the airbag 112 are overlapped with each other when the protrusion 114 is pulled by the strap 116. The end portion 116b of the strap 116 is connected to a strap holding device 118 configured to be able to keep the strap 116 to a certain length and to disengage the strap 116. Although a case where the vent holes 115 are formed on the protrusions 114 is illustrated here, the vent holes 115 must simply be provided on the area α where the protrusions 114 and the surface of the airbag 112 are overlapped with each other, and the vent holes 115 may be provided on the side of the airbag 112. Although the loops 117 are arranged at two positions; on the side of the top portion and on the side of the retainer 113 of the airbag 112, one of them may be omitted.

As shown in FIG. 11(A), when the gas generator 111 is activated and the airbag 112 is inflated and deployed, the strap 116 is brought into a pulled state via the loop 117 in association with the movement of the top portion of the airbag 112. Then, the strap 116 pulls the protrusion 114, and hence pulls the protrusion 114 inward of the airbag 112. At this time, the vent hole 115 is pressed against the area a where the surface of the retracted protrusion 114 and the surface of the airbag 112 are overlapped with each other. Therefore, the vent hole 115 can be closed only by keeping the lengths of the strap 116 at a certain length at the time of inflation and deployment of the airbag 112, so that the discharge of gas can be restrained. The same action is achieved also in a case where the vent holes 115 are provided on the areas α on the side of the airbag 112. Here, an occupant 110 is seated on a seat 119, and FIG. 11(A) shows a state before the occupant 110 collides with the airbag 112. Although the occupant 110 generally fastens the seatbelt, illustration is omitted here.

As shown in FIG. 11(B), when the strap holding device 118 is activated to open a cap 118a at a predetermined timing when the occupant 110 comes into contact with the airbag 112, the strap 116 is also disengaged, and the gas in the airbag 112 flows into the protrusion 114, and hence the internal pressure of the protrusion 114 is increased, so that the protrusion 114 assumes an upright state on the surface of the airbag 112 and the vent hole 115 is opened, whereby the gas in the airbag 112 can be discharged. Although the protrusion 114 is provided at one position here, it may be provided at a plurality of positions. The same action is achieved also in the case where the vent holes 115 are provided on the areas a on the side of the airbag 112.

Although a case where the end portions 106a, 116a of the straps 106, 116 are connected to the inner sides of the protrusions 104, 114 has been described in the side-collision airbag apparatus shown in FIG. 10 and FIG. 11, a configuration in which the end portions 106a, 116a of the straps 106, 116 are connected to the outsides of the protrusions 104, 114, and the insertion hole is formed in the airbag 112 to guide and connect the end portions 106b, 116b into the airbag 112 as in the embodiment shown in FIG. 4 to FIG. 8 is also applicable.

Subsequently, referring now to FIG. 12 and FIG. 14, a configuration and an action of the control device connected to the strap holding device will be described. Here, FIG. 12 is a drawing showing a configuration of the control device of the airbag apparatus according to the present invention. FIG. 13 is a flowchart showing an action of the control device in a case where the gas generator of the airbag apparatus has a single-stage system, in which (A) is a flowchart of a case in which the vent hole is opened when the occupant comes into contact with the airbag, and (B) is a flowchart of a case in which the vent hole is opened and closed according to the weight of the occupant. FIG. 14 is a flowchart showing a case where the activation of the gas generator of the airbag apparatus is interlocked with the activation of the strap holding device.

As shown in FIG. 12, a control device 121 of the present invention is electrically connected to a gas generator 122 and a strap holding device 123, so that the gas generator 122 and the strap holding device 123 are activated on the basis of a signal emitted from the control device 121. The control device 121 corresponds to the control device 34 shown in FIG. 3 and, generally, the ECU (electronic control unit) plays its role. The gas generator 122 is a gas generator in the airbag apparatus and, for example, it corresponds to the gas generators 1, 61, 81, 91, 101, 111 shown in FIG. 1 and so on. The strap holding device 123 corresponds, for example, to the strap holding devices 8, 88, 118 shown in FIG. 1 and so on. Furthermore, the control device 121 is connected to various sensors such as an acceleration sensor 124, a seat load sensor 125, a seat position sensor 126, an airbag pressure sensor 127, an occupant position sensor 128, a vehicle body pressure sensor 129 arranged in the vehicle structure. These sensors do not necessarily have to be connected to the control device 121, and are shown simply as examples.

The acceleration sensor 124 is a sensor configured to detect a sudden deceleration generated on the vehicle body. The control device 121 determines that the vehicle has collided when it is the sudden deceleration which demonstrates the detected value of the acceleration sensor 124 not lower than a predetermined value, and activates the gas generator 122 to inflate and deploy the airbag. The vehicle body pressure sensor 129 is a sensor configured to sense the pressure generated when a substance collides with the surface of the vehicle body. The control device 121 may determine that the vehicle has collided in consideration of both the detected values of the acceleration sensor 124 and the vehicle body pressure sensor 129, and activate the gas generator 122 to inflate and deploy the airbag.

The seat load sensor 125 is a sensor detecting the weight of the occupant seated on the vehicle seat. The seat position sensor 126 is a sensor configured to detect the position of the vehicle seat in terms of the fore-and-aft direction. The control device 121 determines whether the weight of the occupant is heavy or light depending on the output of the seat load sensor 125, and determines whether the physical structure of the occupant is large or small as needed in consideration of the output of the seat position sensor 126.

The airbag pressure sensor 127 is a sensor configured to detect the internal pressure of the airbag, and is a sensor to be used for determining whether the occupant comes into contact with the airbag or not. The occupant position sensor 128 is a sensor including, for example, a CCD camera or the like, and a sensor to be used for visually figuring out the position of the occupant and determining whether the occupant comes into contact with the airbag or not.

Referring first to FIG. 13(A) and FIG. 13(B), a flow from the start of inflation and deployment of the airbag will be described. As shown in FIG. 13(A), when the airbag inflation and deployment is started by a signal from the control device 121 (S1), the control device 121 determines "whether the occupant comes into contact with the airbag or not?" is determined (S2). Whether the occupant comes into contact with the airbag or not is determined, for example, on the basis of the outputs from the airbag pressure sensor 127 or the occupant position sensor 128. Then, when it is determined that the occupant does not come into contact with the airbag (N), the control device 121 maintains a state in which the strap is held (S3). When it is determined that the occupant is in contact with the airbag (Y), the control device 121 emits a release signal for disengaging the strap (S4) to the strap holding device 123 to translate the airbag to a state in which the vent hole is opened (S5).

Also, as shown in FIG. 13(B), the step of determining "is weight of occupant . . . ?" (S6) may be inserted after the start of the airbag inflation and deployment (S1) to determine whether the weight of the occupant is light or heavy and determine whether to emit the release signal to the strap holding device 123. It is because when the weight of the occupant is light, keeping the internal pressure of the airbag low might be desired in order to improve the impact absorbing capability in the case where the occupant comes into contact with the airbag in an initial state at the time of inflation and deployment of the airbag or for the occupant whose weight is light. Then, when the weight of the occupant is lighter than a predetermined reference value (for example, the value in the range of 40 to 50 kg), the control device 121 emits the release signal for disengaging the strap (S4) to the strap holding device 123 to translate the airbag to the state in which the vent hole is opened (S5). Also, when the weight of the occupant is heavier than the predetermined reference value, the control device 121 keeps the state in which the strap is held (S3). The step of determining "has occupant come into contact with airbag?" (S7) may be inserted thereafter. When it is determined that the occupant does not come into contact with the airbag (N), the control device 121 maintains the state in which the strap is held (S3). When it is determined that the occupant is in contact with the airbag (Y), the control device 121 emits a release signal for disengaging the strap (S4) to the strap holding device 123 to translate to the state in which the vent hole is opened (S5).

Also, there is also a case where the control device 121 serves as a control device for both the gas generator 122 and the strap holding device 123 as shown in FIG. 12. In such a case, the control of the gas generator 122 may be interlocked with the control of the strap holding device 123. In particular, it is effective in a case of changing the activation of the gas generator 122 according to the weight or the physical structure of the occupant.

As shown in FIG. 14, when the occupant rides on the vehicle (S11), the control device 121 determines whether the weight of the occupant is light or heavy on the basis of the output from the seat load sensor 125 through the step of "is weight of occupant . . . ?" (S12). Then, the control device 121 sets the strap to be disengaged (S13) when the weight of the occupant is light, and set the strap to be held (S14) when the weight of the occupant is heavy. Also, when the weight of the occupant is light, the control device 121 sets the gas generating amount of the gas generator 122 to be small (for example, to activate only the first gas generator 122' when the gas generator employs the two-stage system) and, when the weight of the occupant is heavy, the control device 121 sets the gas generating amount of the gas generator 122 to be large (for example, both the first gas generator 122' and the second gas generator 122" are activated when the gas generator employs the two-stage system). However, since these processes are not directly related to the present invention, the process flow is omitted in FIG. 14. To set the strap to be disengaged (S13) means to set the process to disengage the strap of the strap holding device 123 when the airbag is inflated and deployed, and to set the strap to be held (S14) means to set the process to hold the strap of the strap holding device 123 when the airbag is inflated and deployed.

Then, in the steps of "has collision of vehicle sensed?" (S15, S16), the control device 121 determined whether the vehicle has collided or not on the basis of the outputs from the acceleration sensor 124 and the vehicle body pressure sensor 129 and, when it is determined that the vehicle has collided (Y), the procedure goes to the steps to start the airbag inflation and deployment (S17, S18). When it is determined that the vehicle has not collided (N), the procedure does not go to the next steps (S17, S18). Then, when the strap is set to be disengaged (S13), that is, when the weight of the occupant is light, the control device 121 performs the process to start the airbag inflation and deployment (S17) and, simultaneously, to disengage the strap (S19), and translate the airbag to a state in which the vent hole is opened (S20). In contrast, when the strap is set to be held (S14), that is, when the weight of the occupant is heavy, a state in which the strap is held (S21) is maintained. In this case, the step of determining "has the occupant come into contact with the airbag?" (S22) may additionally be inserted. When it is determined that the occupant has not come into contact with the airbag (N), the state in which the strap is held (S21) is maintained and, when it is determined that the occupant has come into contact with the airbag (Y), a release signal to disengage the strap (S19) is emitted to the strap holding device 123 to translate the airbag to the state in which the vent hole is opened (S20).

Subsequently, the airbag apparatus provided with a second vent hole on the airbag will be described. Here, FIG. 15 is a cross-sectional side view showing a seventh embodiment of the airbag apparatus according to the present invention. In FIG. 15, the same components as those in the first embodiment shown in FIG. 1 are designated by the same reference numerals and overlapped description will be omitted.

The airbag apparatus shown in FIG. 15 includes a second vent hole 150 on the rear panel 2b of the airbag 2. In other words, the second vent hole 150 is formed at a position other than the area where the protrusion 4 and the airbag 2 are overlapped with each other when the protrusion 4 is pulled. By the provision of the second vent hole 150 as described above, the gas in the airbag 2 can be discharged separately from the vent hole 5 on the protrusion 4. Therefore, although the effect to reduce the pressure loss during the inflation and deployment of the airbag 2 is low, the impact absorbing capability suitable for the physical structure of the occupant can be demonstrated by controlling the opening and closing of the vent hole 5. Although not shown, the protrusion 4 and the second vent hole 150 are provided on both left and right sides of the airbag 2.

For example, when the physical structure of the occupant is large or the weight of the occupant is heavy, an impact applied to the occupant can be alleviated by discharging the gas from the second vent hole 150 when the occupant comes into contact with the airbag 2 while maintaining the vent hole 5 of the protrusion 4 constantly in a closed state to hold the internal pressure of the airbag 2. When the physical structure of the occupant is small or the weight of the occupant is light, the impact applied to the occupant can be alleviated by discharging the gas from both the vent hole 5 and the second vent hole 150 when the occupant comes into contact with the airbag 2 while bringing the vent hole 5 of the protrusion 4 into an opened state simultaneously with the inflation and deployment of the airbag 2 to lower the internal pressure of the airbag 2. In this manner, in the seventh embodiment of the present invention, since demonstration of the impact absorbing capability suitable for the physical structure of the occupant comes in first, employment of the two-stage gas generator also as the gas generator 1 is preferred. For example, the internal pressure of the airbag 2 can be adjusted by activating both the first gas generator and the second gas generator simultaneously to increase the gas generating amount in a case where the physical structure of the occupant is large or the weight of the occupant is heavy, and by activating only the first gas generator to reduce the gas generating amount in a case where the physical structure of the occupant is small or the weight of the occupant is light.

Subsequently, the airbag apparatus having a plurality of protrusions having the vent hole will be described. Here, FIG. 16 is a cross-sectional side view showing an eighth embodiment of the airbag apparatus according to the present invention. In FIG. 16, the same components as those in the first embodiment shown in FIG. 1 are designated by the same reference numerals and overlapped description will be omitted.

The airbag apparatus shown in FIG. 16 includes a protrusion 164 having a vent hole 165 added as the second vent hole in addition to the protrusion 4 having the vent hole 5. Therefore, the airbag 2 shown in FIG. 16 includes the protrusions 4, 164 which form portions protruding outward partly on the airbag 2, vent holes 5, 165 formed on the protrusions 4, 164 straps 6, 166 connected at one end to the protrusions 4, 164 and at the other end to the interior of the airbag 2, and insertion holes 7, 167 configured to guide the other ends of the straps 6, 166 into the interior of the airbag 2, and the vent holes 5, 165 are arranged in areas α where the protrusions 4, 164 and the airbag 2 are overlapped with each other when the protrusions 4, 164 are pulled by the straps 6, 166. Here, the other ends of the straps 6, 166 are connected to the strap holding devices 8, 168 configured to be able to keep the straps 6, 166 to a certain length and to release the straps 6, 166. Although not shown, the protrusions 4, 164 are provided on both left and right sides of the airbag 2.

The airbag apparatus according to the eighth embodiment may be considered to be the airbag apparatus according to the seventh embodiment having opening-closing means provided on the second vent hole 150. In other words, when the physical structure of the occupant is large or the weight of the occupant is heavy, the gas can be discharged by opening one of the vent holes 5, 165 when the occupant comes into contact with the airbag 2 while maintaining the vent holes 5, 165 in a closed state to hold the internal pressure of the airbag 2. Therefore, the airbag apparatus of the eighth embodiment achieves not only demonstration of the impact absorbing capability according to the physical structure of the occupant, but also reduction of the pressure loss during the inflation and deployment of the airbag 2. In contrast, when the physical structure of the occupant is small or the weight of the occupant is light, the internal pressure of the airbag 2 can be lowered and the gas discharging amount when the occupant comes into contact with the airbag 2 can be increased by bringing both the vent holes 5, 165 into an opened state. Also, the gas generator may be configured into the two-stage system as in the case of the airbag apparatus in the seventh embodiment. As the vent hole 165 corresponding to the second vent hole, opening-closing means which includes a vent hole, a strap, or the like as in the related art may be employed. The vent hole 165 may be provided in an area where the protrusion 164 and the airbag 2 overlap with each other on the side of the airbag 2.

Subsequently, a case where the airbag apparatus according to the present invention is applied to so-called a twin airbag will be described. Here, FIG. 17 is a rough cross-sectional view showing a ninth embodiment of the airbag apparatus according to the present invention, in which (A) shows a case where the strap holding device is included, and (B) shows a case where the strap holding device is not included. In the respective drawings, the state in which the vent hole is closed is shown by a solid line and the state in which the vent hole is opened is shown by a long and short dash line.

The airbag apparatus shown in FIG. 17(A) includes a gas generator 171 which generates gas under predetermined conditions, an airbag 172 connected to the gas generator 171 to be inflated and deployed, and a retainer 173 configured to store the airbag 172, the airbag 172 includes a left airbag section 172L configured to be inflated and deployed on the left side of the occupant and a right airbag section 172R configured to be inflated and deployed on the right side of the occupant, and vent holes 175L, 175R are formed on the left airbag section 172L and the right airbag section 172R respectively. More specifically, protrusions 174L, 174R which form portions protruding outward partly on the respective airbag sections 172L, 172R, the vent holes 175L, 175R formed on the protrusions 174L, 174R, straps 176L, 176R connected at one ends to the protrusions 174L, 174R and at the other ends to the interior of the airbag 172, and insertion holes 177L, 177R configured to guide the other ends of the straps 176L, 176R into the interior of the airbag 172, and the vent holes 175L, 175R are arranged in areas a where the protrusions 174L, 174R and the airbag 172 are overlapped with each other when the protrusions 174L, 174R are pulled by the straps 176L, 176R. The end portion of the strap 176 is connected to a strap holding device 178 configured to be able to keep the strap 176 to a certain length and to disengage the strap 176. Although the case where the vent holes 175L, 175R are formed on the respective protrusions 174L, 174R are illustrated here, the vent holes 175L, 175R must simply be provided on the area a where the protrusions 174L, 174R and the surface of the respective airbag sections 172L, 172R are overlapped with each other, and the vent holes 175L, 175R may be provided on the side of the respective airbag sections 172L, 172R.

When closing of the respective vent holes 175L, 175R is wanted, the strap holding device 178 may be set so as not to be activated shown by a solid line. Also, when opening of the respective vent holes 175L, 175R is wanted, the strap holding device 178 must simply be activated to open a cap 178a and disengage the respective straps 176L, 176R shown by a long and short dash line. In this case, the respective straps 176L, 176R are subjected to a loss of tensile force, and the protrusions 174L, 174R assume an upright state on the surface of the respective airbag sections 172L, 172R because the internal pressures in the protrusions 174L, 174R are increased by the gas flowing therein, so that the respective vent holes 175L, 175R are brought into an opened state, so that the gas in the airbag 172 can be discharged. The same action is achieved also in a case where the vent holes 175L, 175R are provided on the areas α on the side of the airbag 172.

The airbag apparatus shown in FIG. 17(B) shows a case where the present invention is applied to the twin airbag in which the strap holding device 178 is not included. More specifically, the end portions of the respective straps 176L, 176R are seamed to a joint portion 172a of the respective airbag sections 172L, 172R. Other portions are basically the same as the one shown in FIG. 17(A), and hence detailed description will be omitted. As shown by a solid line in FIG. 17(B), when the airbag 172 is inflated and deployed, the respective vent holes 175L, 175R are pulled by the respective straps 176L, 176R and are brought into a closed state. As indicated by a long and short dash line in FIG. 17(B), when the occupant (not shown) comes into contact with the airbag 172, the straps 176L, 176R are subjected to a lowering of tensile force, and the respective protrusions 174L, 174R assume an upright state on the surface of the respective airbag sections 172L, 172R because the internal pressures in the protrusions 174L, 174R are increased by the gas flowing therein, so that the respective vent holes 175L, 175R are brought into an opened state, so that the gas in the airbag 172 can be discharged. The same action is achieved also in a case where the vent holes 175L, 175R are provided on the areas α on the side of the respective airbag sections 172L, 172R. It is also applicable to connect the end portions of the respective straps 176L, 176R to inner surfaces of the respective airbag sections 172L, 172R instead of seaming the same to the joint portion 172a of the respective airbag sections 172L, 172R.

According to the airbag or the airbag apparatus in the first to the ninth embodiments described above, by forming the protrusion protruding outward from part of the airbag and forming the vent hole on the protrusion or the airbag, the vent hole can be closed by pressing the protrusion against the surface of the airbag and the vent hole can be opened by bringing the protrusion apart from the surface of the airbag to discharge the gas in the airbag. In the respective embodiments, the vent holes may be provided both on the protrusion and the airbag.

Subsequently, the airbag apparatus according to the present invention which is configured to be able to open and close the vent hole without providing the protrusion on the airbag will be described with reference to FIG. 18 to FIG. 20. Here, FIG. 18 is a rough cross-sectional view showing a tenth embodiment of the airbag apparatus according to the present invention, in which (A) shows a case where the airbag is pulled on the side of the top portion side, and (B) shows a case where the airbag is pulled toward the retainer. In the respective drawings, the state in which the vent hole is closed is shown by a solid line and the state in which the vent hole is opened is shown by a long and short dash line.

The airbag apparatus shown in FIG. 18(A) includes a gas generator 181 configured to generate gas under predetermined conditions, an airbag 182 connected to the gas generator 181 and configured to be inflated and deployed, and a retainer 183 configured to store the airbag 182, and the airbag 182 includes vent holes 185, 185 formed on the airbag 182, straps 186 connected at one end to the airbag 182 and at the other end to the interior of the airbag 182, and the respective vent holes 185 are arranged in areas α where the surface of the airbag 182 is overlapped when the airbag 182 is pulled by the strap 186. More specifically, an end portion 186a of the strap 186 is joined to an inner surface of the airbag 182, and an end portion 186*b* is connected to a position in the vicinity of a top portion of the airbag 182. The lengths of the straps 186 are designed to be able to form areas α where the surface of the airbag 182 overlap in a state in which the inflation and deployment of the airbag 182 is completed as shown in FIG. 18(A). The surface areas of the areas α are designed arbitrary according to the size or the like of the vent holes 185, and the lengths of the straps 186 are also designed correspondingly.

As shown in FIG. 18(A) by a solid line, when the gas generator 181 is activated and the airbag 182 is inflated and deployed, the respective straps 186 are brought into a pulled state in association with the movement of the top portion of the airbag 182. Then, the respective straps 186 pull the surface of the airbag 182 from the inside toward the top portion of the airbag 182, and deforms the airbag 182 so as to pull the inner side of the airbag 182 around the vent holes 185. The areas α of the airbag 182 pulled inward close the vent holes 185 by pushing against each other by the internal pressure. Therefore, the vent holes 185 can be closed by the surface of the airbag 182 only by keeping the lengths of the straps 186 at a certain length at the time of inflation and deployment of the airbag 182, so that the discharge of gas can be restrained.

As shown in FIG. 18(A) by a long and short dash line, when the occupant (not shown) comes into contact with the airbag 182, the top portion of the airbag 182 is moved toward the retainer 183, and the respective straps 186 assume a loosened state, whereby tensile forces are lowered. Simultaneously, the areas α pulled inward by the pressure fluctuation by the deformation of the airbag 182 appear to the surface of the airbag 182, the vent holes 185 are opened, so that the gas in the airbag 182 can be discharged.

The airbag apparatus shown in FIG. 18(B) is provided with loops 187 on the side of the retainer 183, and the end portions 186*b* of the straps 186 are connected to portions near the top portion of the airbag 182 via the loops 187. When the straps 186 are connected in this manner, the areas a which overlap with each other by pulling the airbag 182 toward the retainer 3 are formed. Other configurations and actions are the same as the one shown in FIG. 18(A), and hence detailed description will be omitted.

Subsequently, a case where the strap holding device is provided will be described. Here, FIG. 19 is a rough cross-sectional view showing an eleventh embodiment of the airbag apparatus according to the present invention, in which (A) shows a case where the straps are connected to the outside of the airbag, and (B) shows a case where the straps are connected to the inside of the airbag. In the respective drawings, the state in which the vent holes are closed is shown by a solid line and the state in which the vent hole is opened is shown by a long and short dash line.

The airbag apparatus shown in FIG. 19(A) includes a gas generator 191 configured to generate gas under predetermined conditions, an airbag 192 connected to the gas generator 191 and configured to be inflated and deployed, and a retainer 193 configured to store the airbag 192, and the airbag 192 includes vent holes 195, 195 formed on the airbag 192, insertion holes 197, 197 formed on the airbag 192, straps 196 connected at end portions 196*a* at one ends to the surface of the airbag 192 and passed at end portions 196*b* at the other ends through the insertion holes 197 and guided to the interior of the airbag 192, and the respective vent holes 195 are arranged in areas a where the surface of the airbag 192 is overlapped when the airbag 192 is pulled by the straps 196. The end portion 196*b* of the strap 196 is connected to a strap holding device 198 configured to be able to keep the strap 196 to a certain length and to disengage the strap 196.

As shown in FIG. 19(A) by a solid line, when the gas generator 191 is activated and the airbag 192 is inflated and deployed, the respective straps 196 are brought into a pulled state in association with the movement of the top portion of the airbag 192. Then, the respective straps 196 pull the surface of the airbag 192 from the outside, and deform the airbag 192 so as to press the airbag 192 around the vent holes 195 against the surface of the airbag 192. The areas a of the airbag 192 deformed and folded close the vent holes 195 by pushing against each other by the internal pressure. Therefore, the vent holes 195 can be closed by the surface of the airbag 192 only by keeping the lengths of the straps 196 at a certain length at the time of inflation and deployment of the airbag 192, so that the discharge of gas can be restrained.

As shown in FIG. 19(A) by a long and short dash line, what has to be done when opening of the vent holes 195 and discharging the gas are wanted is to activate the strap holding device 198, open the cap 198*a*, and disengage the straps 196. When the strap holding device 198 is activated before or when the occupant (not shown) comes into contact with the airbag 192, the capacity of the airbag 192 can be increased temporarily by disengagement of the strap 196, and the gas can be discharged from the vent hole 195. With the action as described above, the impact with respect to the occupant is effectively reduced.

The airbag apparatus shown in FIG. 19(B) shows a case where the end portions 196*a* of the straps 196 are connected to the inside of the airbag 192. In this case, it is not necessary to provide the insertion holes 197 shown in FIG. 19(A). In this case as well, in the same manner as the FIG. 19(A), the areas α where the surface of the airbag 192 overlaps can be formed at the time of inflation and deployment of the airbag 192, so that the vent holes 195 can be closed. Also, by activating the strap holding device 198, the airbag 192 is deformed by the internal pressure, so that the vent holes 195 are opened and the gas in the airbag 192 can be discharged. Other configurations and actions are the same as the one shown in FIG. 19(A), and hence detailed description will be omitted.

Finally, a modification of the airbag apparatus shown in FIG. 18(A) will be described. Here, FIG. 20 is the modification of the airbag apparatus shown in FIG. 18(A), in which (A) shows a case where the straps are connected to the tethers and (B) shows a case where the straps are connected to the inner panels. In the respective drawings, the state in which the vent hole is closed is shown by a solid line and the state in which the vent hole is opened is shown by a long and short dash line. The same components as the airbag apparatus shown in FIG. 18(A) are designated by the same reference numerals and overlapped description will be omitted.

The airbag apparatus shown in FIG. 20(A) includes tethers 201, 201 which adjust the shape of the airbag connected to the interior of the airbag 182 in the vicinity of the top portion of the airbag 182 and to the retainer 183 side. Then, the end portions 186*b* of the straps 186 are connected to the tethers 201. When the straps 186 are connected in this manner as well, the same advantages as the airbag apparatus shown in FIG. 18(A) are achieved.

The airbag apparatus shown in FIG. 20(B) includes inner panels 202*a*, 202*b* which adjust the shape of the airbag and partition the interior of the airbag 182 to form the inner bag connected to the interior of the airbag 182. The inner panels 202*a*, 202*b* may be formed integrally or may be formed of separate members and joined at substantially center portions thereof. The inner panels 202*a*, 202*b* have a substantially cylindrical shape, and are formed with an opening for forming a space which communicates with an outer periphery. Then, the end portions 186*b* of the straps 186 are connected to the surface of the inner panel 202b. When the straps 186 are connected in this manner as well, the same advantages as the airbag apparatus shown in FIG. 18(A) are achieved. The end portion 186b of the strap 186 may be connected to the surface of the inner panel 202a, or may be connected to a joint portion between the inner panel 202a and the inner panel 202b.

According to the airbag or the airbag apparatus in the tenth and eleventh embodiments described above, by forming the vent holes on the airbag, the vent holes can be closed on the surface of the airbag by causing the airbag to be deformed, and the vent hole can be opened by causing the airbag to be deformed to discharge the gas in the airbag. In the respective embodiments, a plurality of the vent holes may be provided both on the area α where the surfaces of the airbag are overlapped with each other.

The present invention is not limited to the embodiments described above, and various modifications may be made without departing from the scope of the present invention such that (1) the invention can be applied to all the airbags having the vent hole and, can be applied to, for example, a curtain airbag apparatus, a knee airbag apparatus, and a pedestrian airbag apparatus, and (2) the airbag and the airbag apparatus in which the respective embodiments are combined adequately may be employed.

BRIEF DESCRIPTION OF THE DRAWINGS

FIG. 2 is an enlarged drawing of a protrusion, in which (A) shows a case where a vent hole has a hole shape, (B) shows a case where the vent hole has a slit shape, and (C) shows a case where the vent hole is formed at a seamed portion.

FIG. 3 is a schematic cross-sectional view showing a strap holding device, in which (A) shows a pressurizing type and (B) shows a cylinder type.

FIG. 4 is an explanatory drawing showing an action of the strap holding device in a case where an end portion of a strap is fixed to an airbag, in which (A) shows a state in which the vent hole is closed, and (B) shows a state in which the vent hole is opened.

FIG. 5 is an explanatory drawing showing an action of the strap holding device in a case where the end portion of the strap is connected to the strap holding device, in which (A) shows a state in which the vent hole is closed, and (B) shows a state in which the vent hole is opened.

FIG. 11 is a rough cross-sectional view showing a sixth embodiment of the airbag apparatus according to the present invention, in which (A) shows a state in which the vent hole is closed, and (B) shows a state in which the vent hole is opened.

FIG. 13 is a flowchart showing an action of the control device in a case where a gas generator of the airbag apparatus has a single-stage system, in which (A) is a flowchart of a case in which the vent hole is opened when an occupant comes into contact with the airbag, and (B) is a flowchart of a case where the vent hole is opened and closed according to the weight of the occupant.

FIG. 17 is a rough cross-sectional view showing a ninth embodiment of the airbag apparatus according to the present invention, in which (A) shows a case where the strap holding device is included, and (B) shows a case where the strap holding device is not included.

FIG. 18 is a rough cross-sectional view showing a tenth embodiment of the airbag apparatus according to the present invention, in which (A) shows a case where the airbag is pulled on the side of a top portion, and (B) shows a case where the airbag is pulled toward a retainer.

FIG. 19 is a rough cross-sectional view showing an eleventh embodiment of the airbag apparatus according to the present invention, in which (A) shows a case where the straps are connected to the outside of the airbag, and (B) shows a case where the straps are connected to the inside of the airbag.

FIG. 20 is a modification of the airbag apparatus shown in FIG. 18(A), in which (A) shows a case where the straps are connected to tethers and (B) shows a case where the straps are connected to inner panels.

Figure 1:
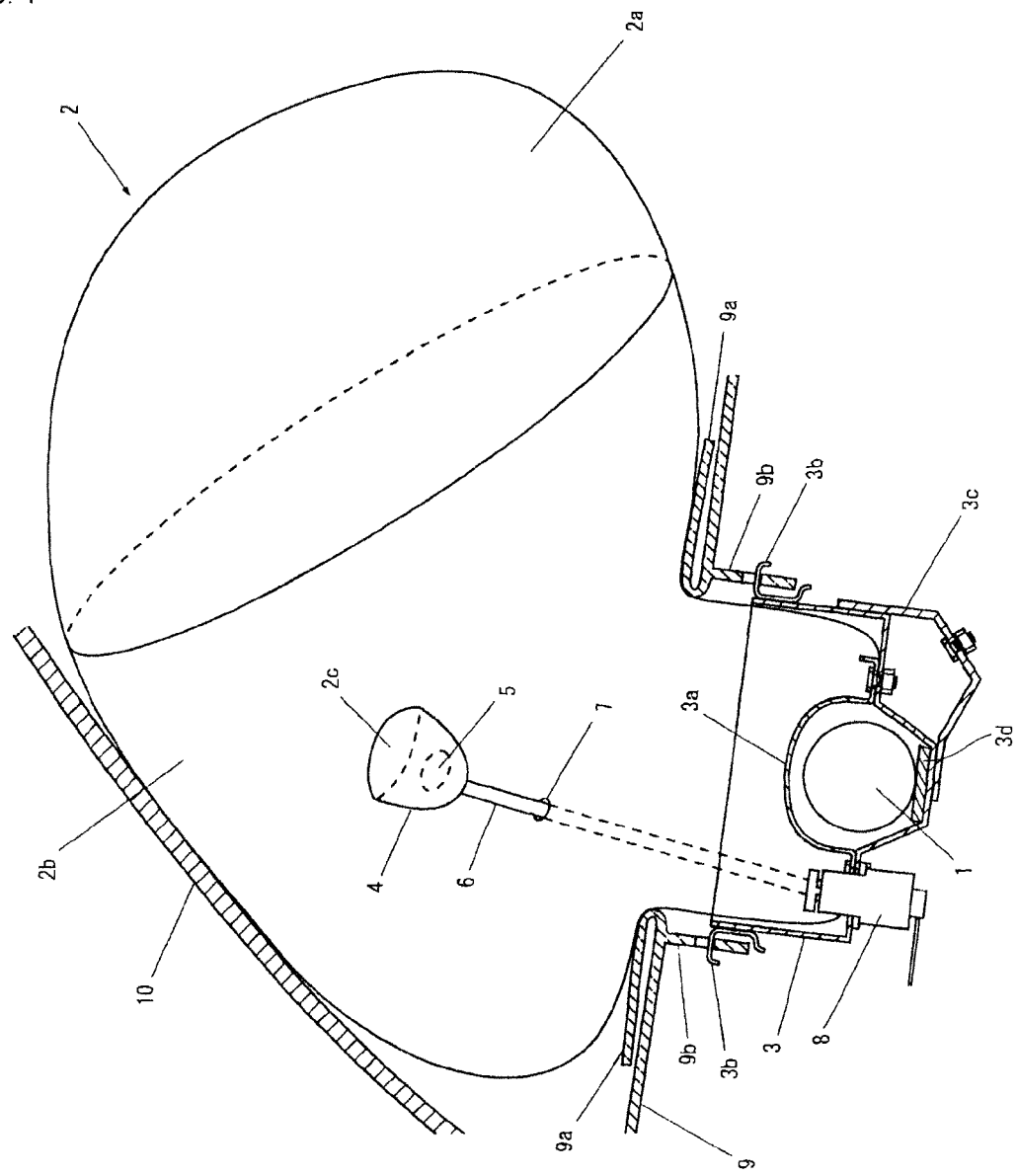
FIG. 1 is a cross-sectional side view showing a first embodiment of an airbag apparatus according to the present invention.
Figure 6:
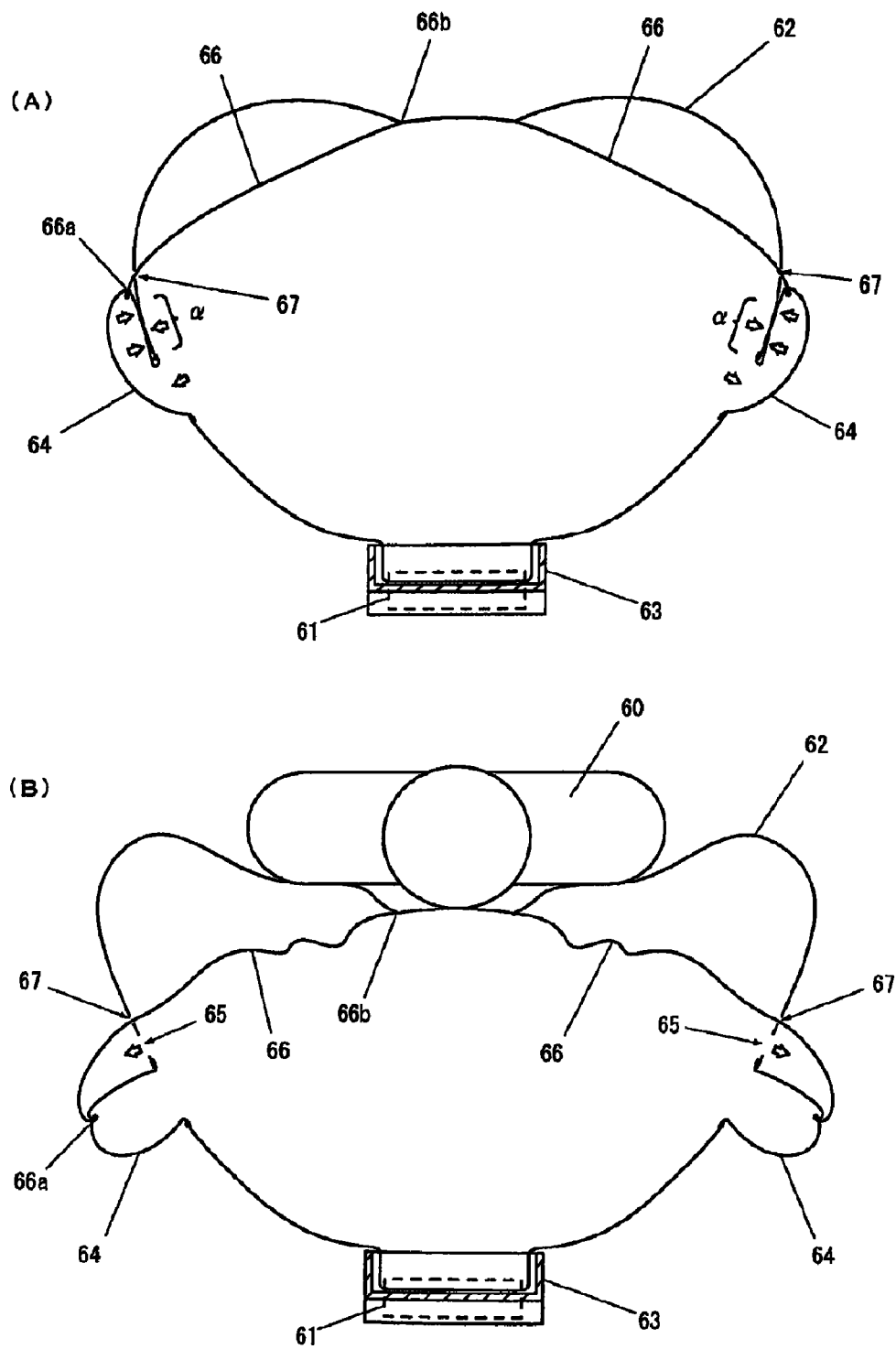
FIG. 6 is a rough cross-sectional view showing a second embodiment of the airbag apparatus according to the present invention, in which (A) shows a state in which the vent hole is closed, and (B) shows a state in which the vent hole is opened.
Figure 7:
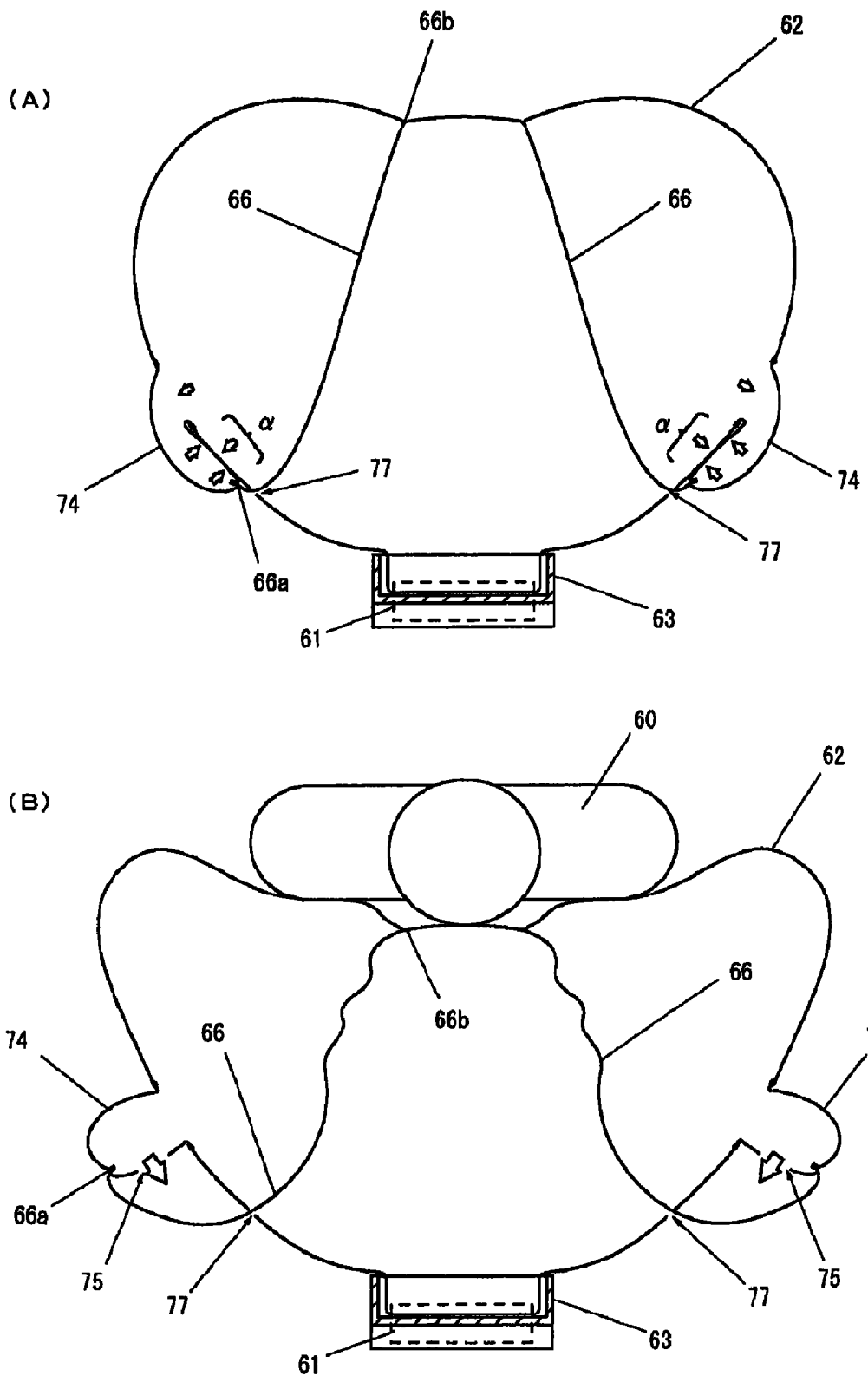
FIG. 7 is a rough cross-sectional view showing a modification of the second embodiment, in which (A) shows a state in which the vent hole is closed, and (B) shows a state in which the vent hole is opened.
Figure 8:
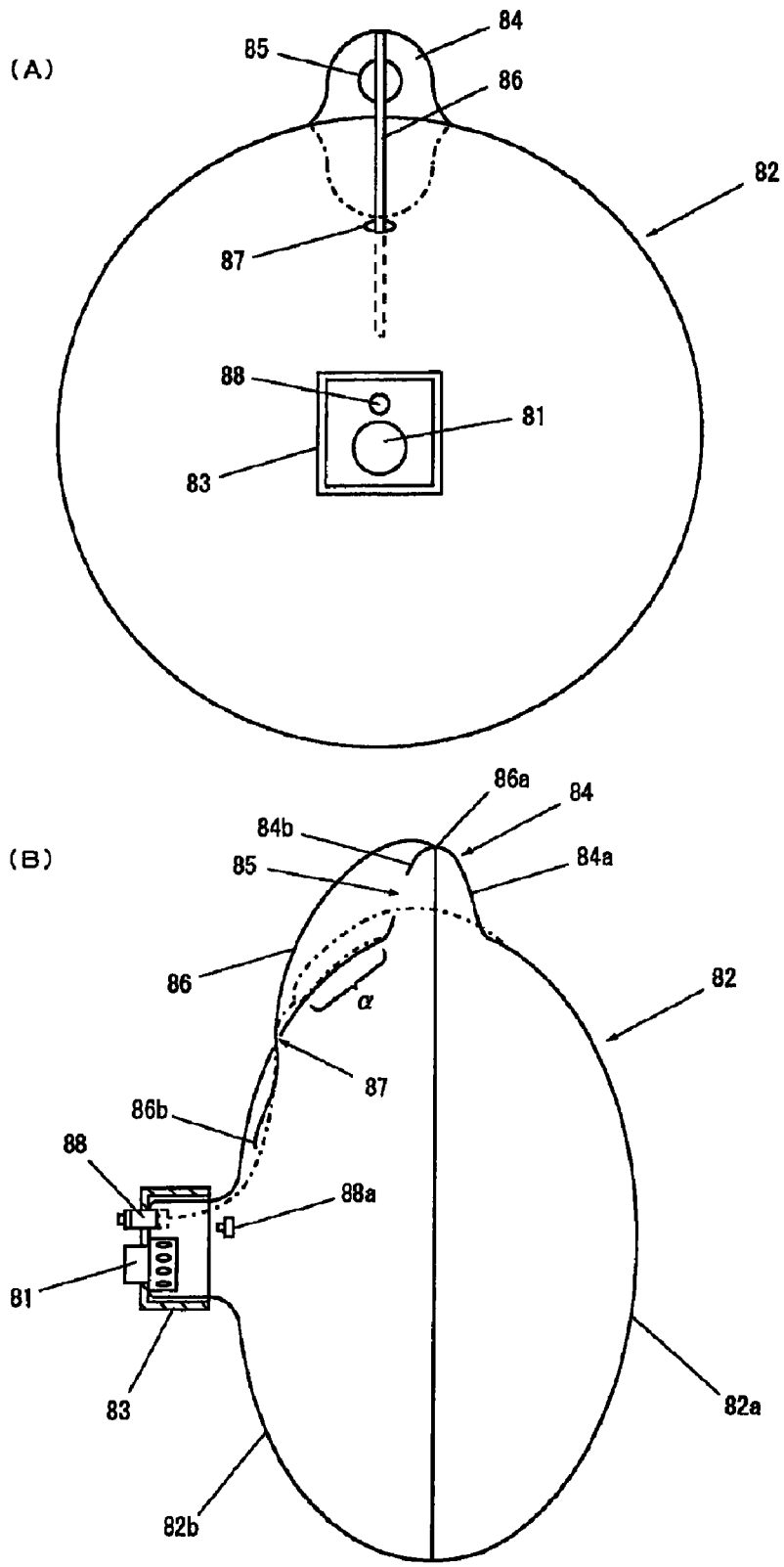
FIG. 8 is an explanatory drawing showing a third embodiment of the airbag apparatus according to the present invention, in which (A) is a back view and (B) is a side cross-sectional view.
Figure 9:
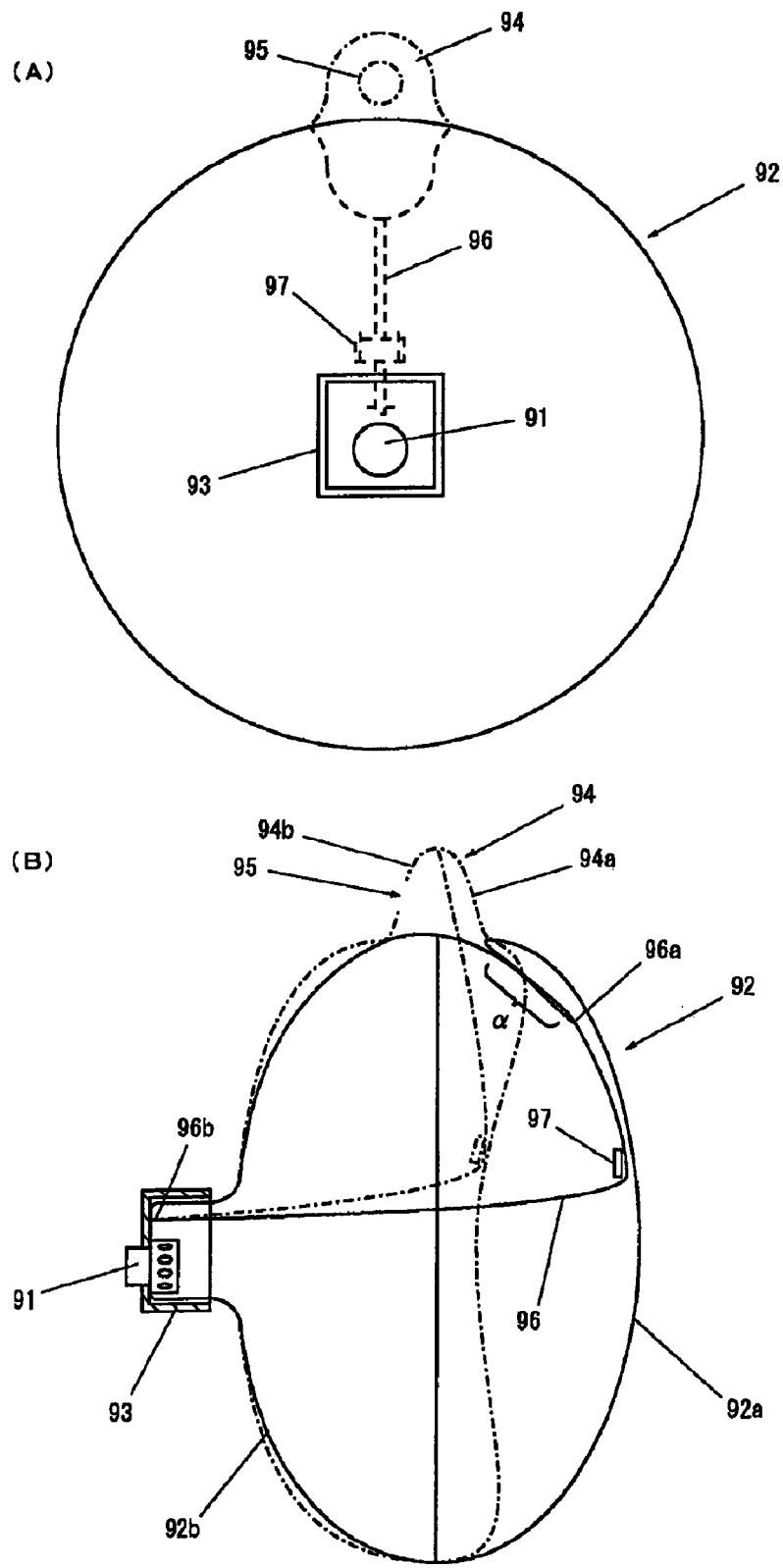
FIG. 9 is an explanatory drawing showing a fourth embodiment of the airbag apparatus according to the present invention, in which (A) is a back view and (B) is a side cross-sectional view.
Figure 10:
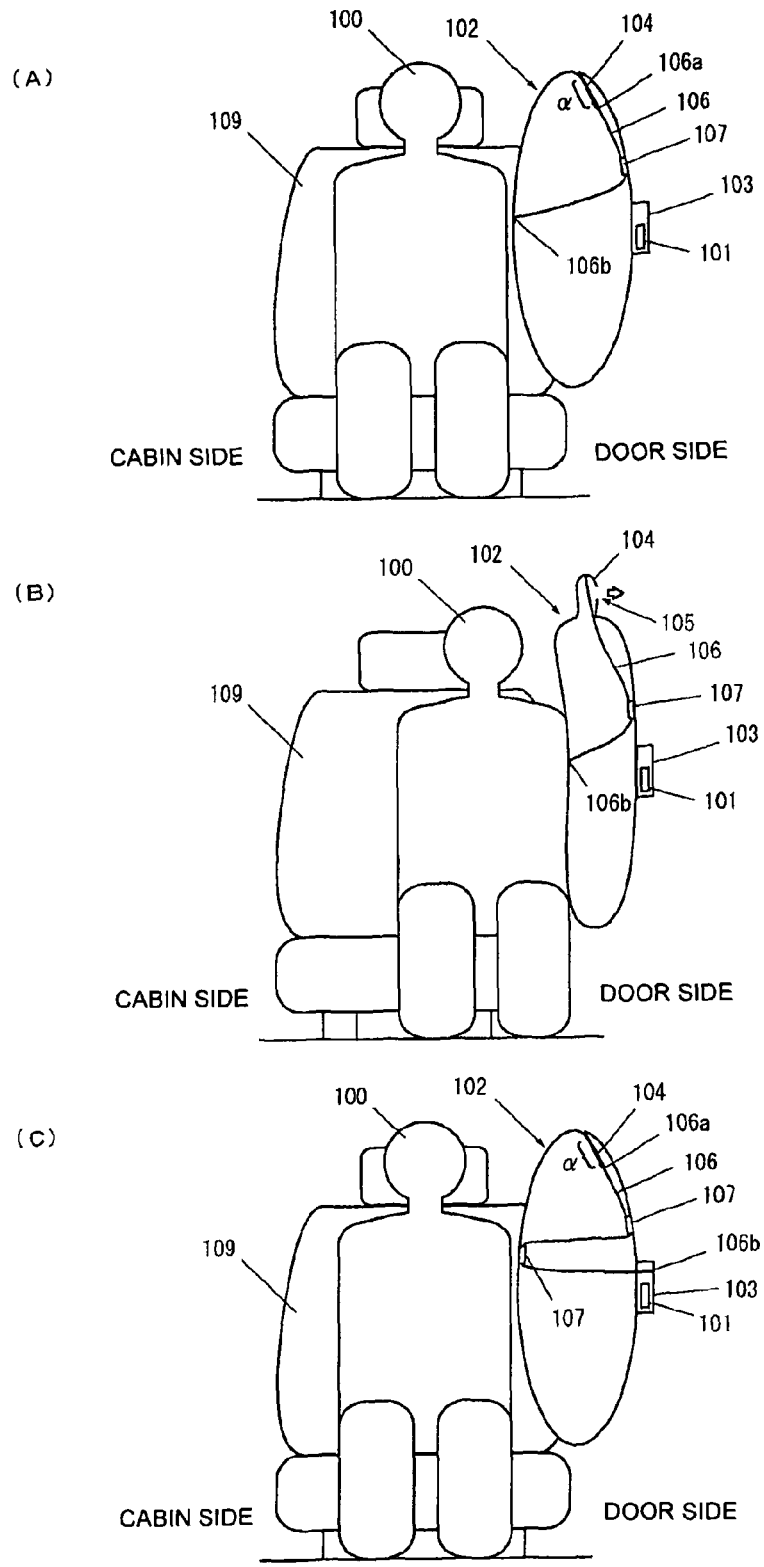
FIG. 10 is a rough cross-sectional view showing a fifth embodiment of the airbag apparatus according to the present invention, in which (A) shows a state in which the vent hole is closed, (B) shows a state in which the vent hole is opened, and (C) shows a modification.
Figure 12:
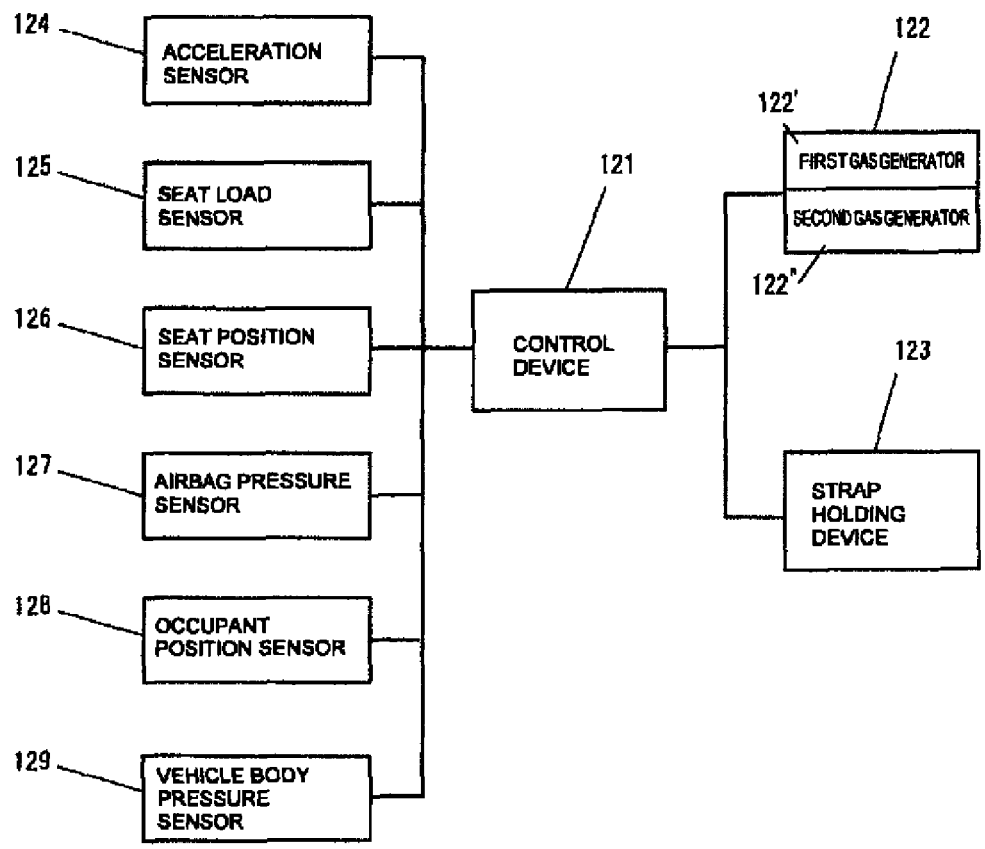
FIG. 12 is a drawing showing a configuration of a control device of the airbag apparatus according to the present invention.
Figure 14:
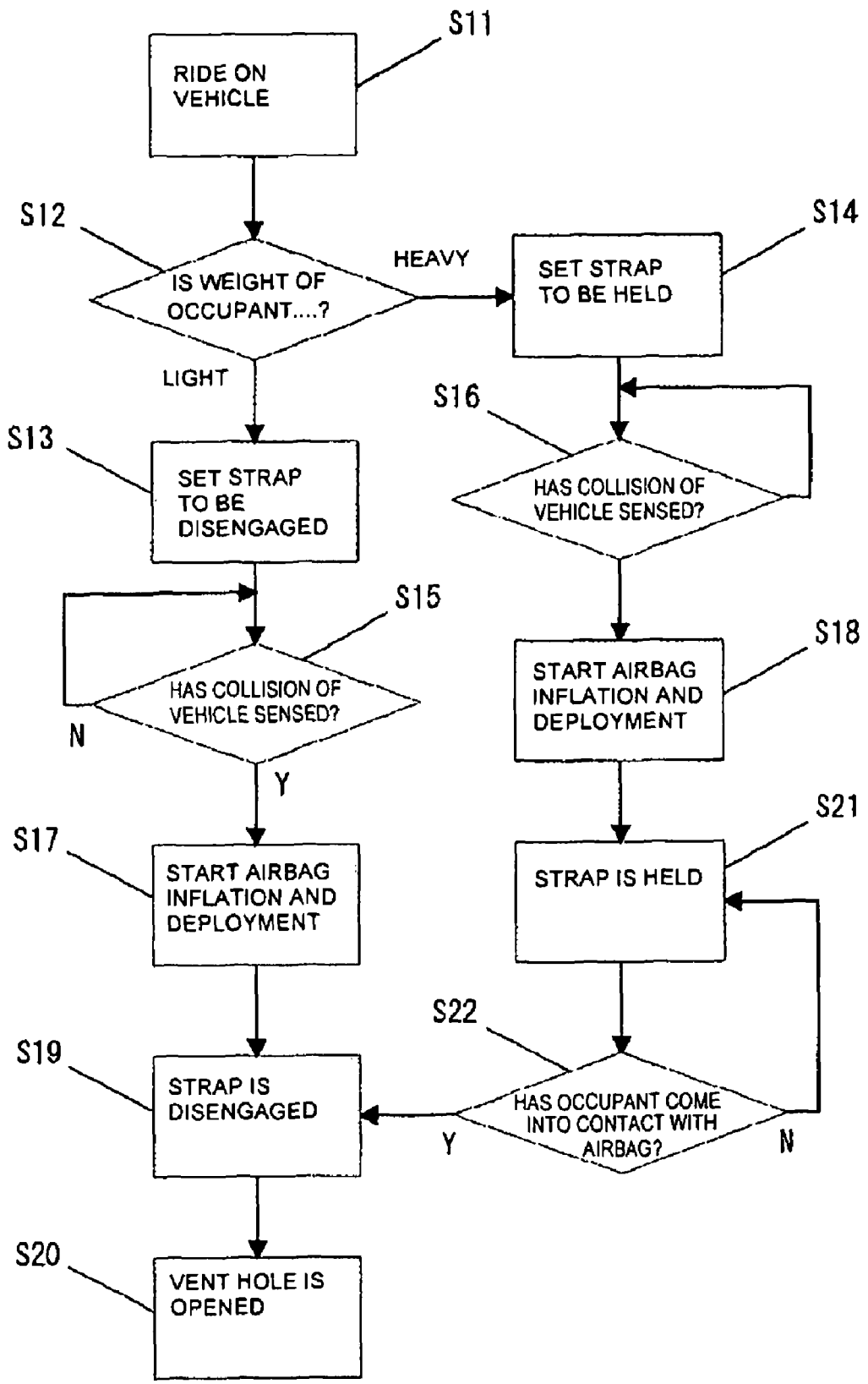
FIG. 14 is a flowchart showing a case where the activation of the gas generator of the airbag apparatus is interlocked with the activation of the strap holding device.
Figure 15:
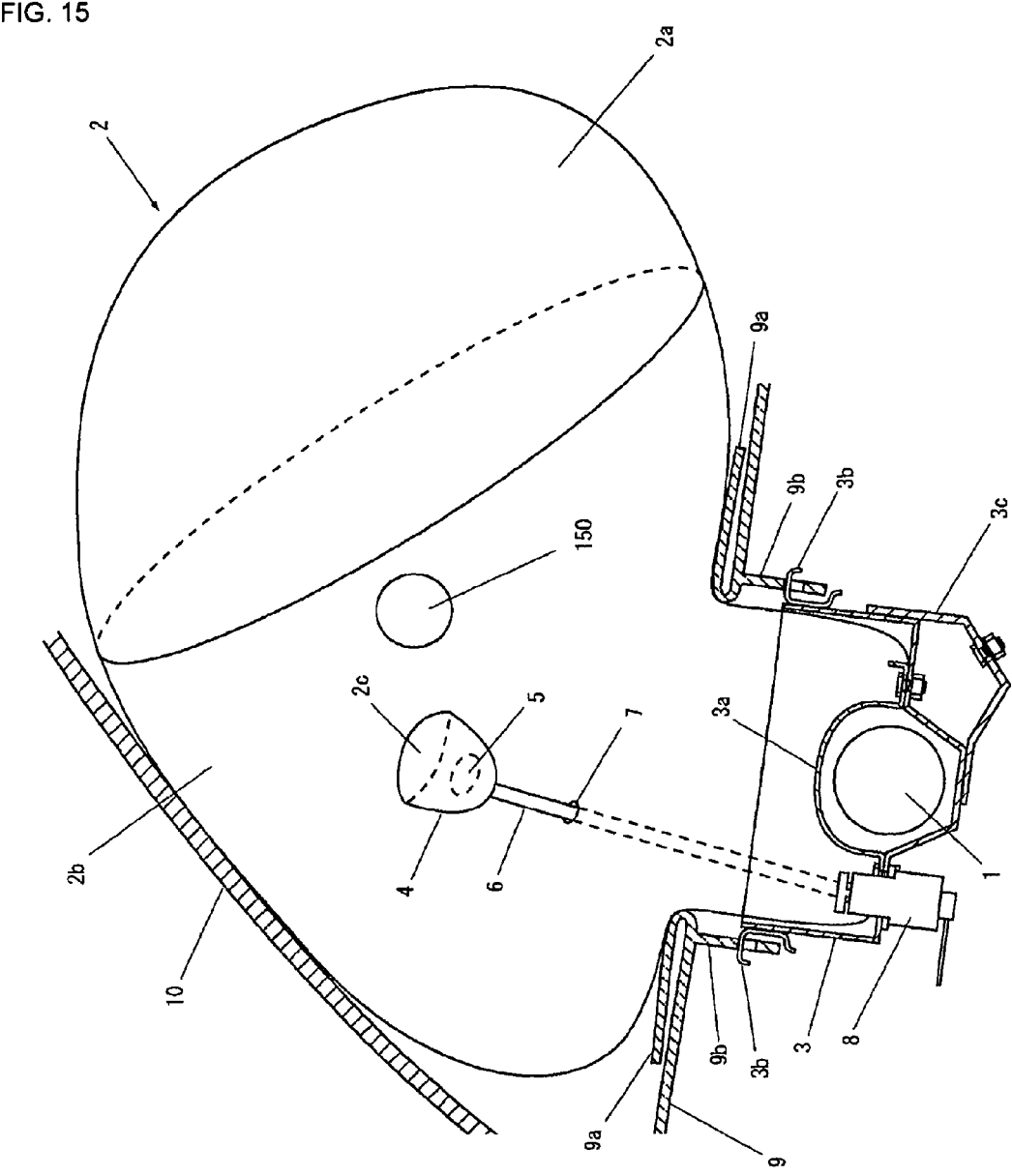
FIG. 15 is a cross-sectional side view showing a seventh embodiment of the airbag apparatus according to the present invention.
Figure 16:
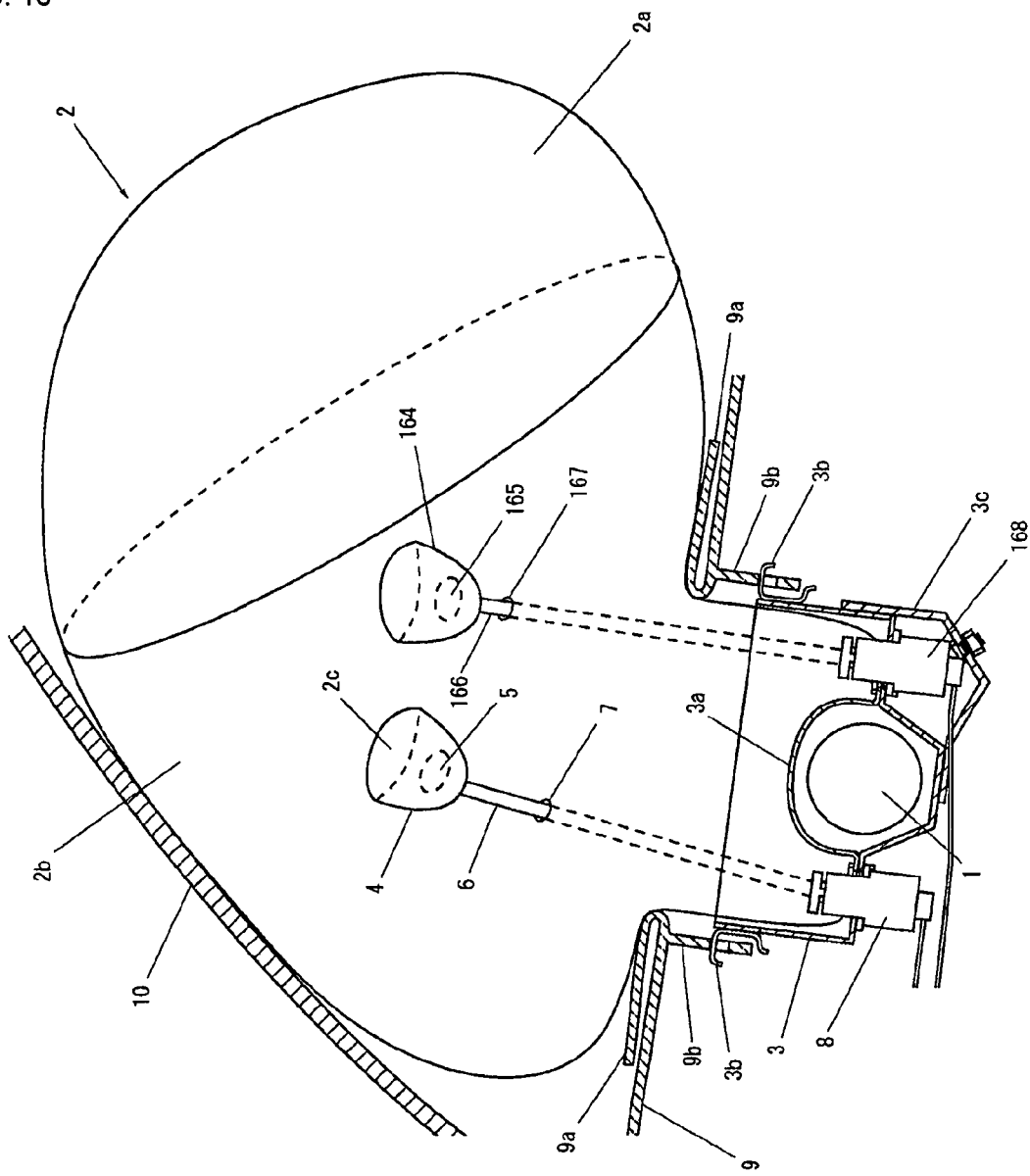
FIG. 16 is a cross-sectional side view showing an eighth embodiment of the airbag apparatus according to the present invention.

The invention claimed is:

1. An airbag configured to be inflated and deployed by being supplied with gas into an interior thereof comprising:
    an inner surface forming the interior of the airbag;
    an outer surface on an opposite side of the inner surface, the outer surface facing an exterior of the airbag;
    a vent hole formed on the airbag; and
    a strap connected at one end to the airbag and at the other end to a component of the airbag or a mounting component of the airbag,
    wherein the vent hole is arranged in an area where one portion of the outer surface and its corresponding inner surface portion overlap with another portion of the outer surface such that the vent hole is covered by one of the overlapping one and another portions of the outer surfaces when the airbag is pulled by the strap, and
    wherein the one and another portions of the outer surface remain outside of the interior of the airbag when the one and another portions of the outer surface overlap when the airbag is pulled by the strap.

2. The airbag according to claim 1, wherein the vent hole is opened by deformation of the airbag.

3. The airbag according to claim 1, wherein the one portion of the outer surface is formed on a protrusion protruding outward from a surface area of the outer surface, wherein the vent hole is formed on the protrusion or the another portion of the outer surface, wherein the one end of the strap is connected to the protrusion, and wherein the vent hole is arranged in an area where the protrusion and the another portion of the outer surface are overlapped with each other when the protrusion is pulled by the strap.

4. The airbag according to claim 3, wherein the vent hole is opened by the protrusion standing upright from the surface area of the outer surface.

5. The airbag according to claim 4, wherein internal pressure of the protrusion is increased and the protrusion stands upright by the gas flowing from the airbag into the protrusion.

6. The airbag according to claim 3, wherein the protrusion includes a first panel formed with the vent hole and a second panel continuously connected to the first panel, and the first panel and the second panel are seamed to a mounting hole formed on the airbag.

7. The airbag according to claim 3, wherein the airbag includes a front panel arranged on a side of an occupant and a rear panel arranged on a side of a vehicle structure, and wherein the protrusion is formed by seaming protruding portions formed on outer peripheral portions of the front panel and the rear panel.

8. The airbag according to claim 1, wherein the outer surface of the airbag is formed with an insertion hole for guiding the other end of the strap into the interior of the airbag.

9. The airbag according to claim 1, wherein the inner surface of the airbag is formed with a loop for guiding the other end of the strap.

10. The airbag according to claim 1, wherein the airbag includes a left airbag section to be inflated and deployed on a left side of an occupant, and a right airbag section to be inflated and deployed on a right side of the occupant, and wherein the left airbag section and the right airbag section are respectively formed with the vent hole.

11. The airbag according to claim 1, wherein the airbag includes a second vent hole formed at a position other than the area.

12. The airbag according to claim 1, wherein the component of the airbag is one of an outer panel which forms the airbag, a tether arranged in the airbag, and an inner panel arranged in the airbag.

13. The airbag according to claim 1, wherein the mounting component is one of a retainer configured to store the airbag, a back plate coupled to the retainer, and a cover coupled to the retainer.

14. An airbag apparatus comprising a gas generator configured to generate gas under specific conditions; an airbag connected to the gas generator to be inflated and deployed; and a retainer configured to store the airbag, wherein the airbag is the airbag according to claim 1.

15. The airbag apparatus according to claim 14, comprising:
a strap holding device configured to be able to keep the strap at a certain length and to be able to disengage the strap; and
a control device configured to emit a release signal for disengaging the strap from the strap holding device.

16. The airbag apparatus according to claim 15, wherein the control device is configured to emit the release signal when the gas generator is activated, when an occupant comes into contact with the airbag, or when a weight of the occupant is lighter than a predetermined reference value.

17. The airbag apparatus according to claim 15, wherein the control device is configured to not emit the release signal when the airbag includes a second vent hole, and a weight of an occupant is heavier than a predetermined reference value.

18. The airbag apparatus according to claim 15, wherein the gas generator includes a first gas generator and a second gas generator, wherein the control device is configured to emit the release signal substantially at the same time as when the gas generator is activated when only the first gas generator is activated.

19. The airbag apparatus according to claim 15, wherein the control device is configured to not emit the release signal when the airbag includes a second vent hole, the gas generator includes a first gas generator and a second gas generator, and both the first gas generator and the second gas generator are activated.

20. The airbag apparatus according to claim 15, wherein the strap holding device includes a cap which is engageable with an engaging hole formed on the strap, a holder which can fix the cap, a releasing device connected to the holder and being capable of releasing the fixation of the cap, and a connector configured to receive the release signal which activates the releasing device from the control device.

21. The airbag apparatus according to claim 20, wherein the releasing device includes the gas generator.

22. The airbag according to claim 1, wherein, when the airbag is pulled by the strap, the one portion of the outer surface abuts the another portion of the outer surface as the one and another portions of the outer surface overlap.

23. The airbag according to claim 1, wherein, when the airbag is pulled by the strap, the one portion of the outer surface and its corresponding inner surface portion are folded over onto the another portion of the outer surface.

24. An air-discharging method of an airbag configured to be supplied with gas in an interior thereof and inflated and deployed comprising:
forming a vent hole on the airbag;
closing the vent hole on an outer surface of the airbag by deforming the airbag such that one portion of the outer surface and its corresponding inner surface portion are folded onto another portion of the outer surface so as to form overlapping outer surface portions that remain outside of the interior of the airbag, wherein the vent hole is covered by one of the overlapping outer surface portions; and
discharging the gas in the airbag by opening the vent hole by deforming the airbag such that the one and another portions of the outer surface are not overlapping.

25. An air-discharging method of an airbag configured to be supplied with gas in an interior thereof and inflated and deployed comprising:
forming a protrusion protruding outward from an outer surface area of the airbag, wherein a connection of the outer surface area to the protrusion circumscribes around a base of the protrusion;
forming a vent hole on the protrusion or the outer surface area of the airbag;
closing the vent hole by pressing an outer surface of the protrusion against the outer surface area of the airbag;
opening the vent hole by filling the protrusion up with gas so as to stand upright from the outer surface area of the airbag such that the connection of the outer surface area to the protrusion remains around the base of the protrusion; and
discharging the gas in the airbag.

\* \* \* \* \*